United States Patent
Lilly et al.

(10) Patent No.: US 11,542,877 B2
(45) Date of Patent: Jan. 3, 2023

(54) SYSTEMS AND METHODS FOR COUNTER FLOW MANAGEMENT AND VALVE MOTION SEQUENCING IN ENHANCED ENGINE BRAKING

(71) Applicant: Jacobs Vehicle Systems, Inc., Bloomfield, CT (US)

(72) Inventors: Ryan Lilly, Manchester, CT (US); Matei Alexandru, Longmeadow, MA (US); Justin D. Baltrucki, Canton, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 195 days.

(21) Appl. No.: 16/054,701

(22) Filed: Aug. 3, 2018

(65) Prior Publication Data

US 2019/0040802 A1 Feb. 7, 2019

Related U.S. Application Data

(60) Provisional application No. 62/540,763, filed on Aug. 3, 2017.

(51) Int. Cl.
*F02D 13/04* (2006.01)
*F01L 13/06* (2006.01)
(Continued)

(52) U.S. Cl.
CPC .......... *F02D 13/0276* (2013.01); *F01L 1/181* (2013.01); *F01L 13/065* (2013.01);
(Continued)

(58) Field of Classification Search
CPC ............. F02D 13/0276; F02D 2200/04; F02D 13/028; F01L 1/181; F01L 13/065;
(Continued)

(56) References Cited

U.S. PATENT DOCUMENTS

| | | | |
|---|---|---|---|
| 5,121,723 A | 6/1992 | Stepper et al. | |
| 5,410,882 A * | 5/1995 | Davies | F01L 13/065 60/602 |

(Continued)

FOREIGN PATENT DOCUMENTS

| | | |
|---|---|---|
| CN | 106257012 A | 12/2016 |
| CN | 106285966 A | 1/2017 |

(Continued)

OTHER PUBLICATIONS

International Search Report for International Application No. PCT/US2018/045264 dated Nov. 28, 2019, 3 pages.
(Continued)

*Primary Examiner* — David Hamaoui
(74) *Attorney, Agent, or Firm* — Moreno IP Law LLC

(57) ABSTRACT

Systems and methods for managing excessive intake flow path pressure and counter flow are implemented to support enhanced engine braking applications, such as 2-stroke or 1.5-stroke engine braking implementations where the intake flow path may be exposed to excessive transient pressures in the combustion chamber during activation or deactivation of an engine brake. Intake throttle, exhaust gas recirculation (EGR) valve, intake manifold blow-off valve, compressor bypass valve, exhaust throttle, turbocharger geometry or turbocharger waste gate may be controlled to effectuate counter flow management separately or in combination. Excessive transient conditions may also be prevented or managed by sequential valve motion in which brake motion activation occurs first and then exhaust valve main event deactivation occurs second. Delay between brake activation and main event deactivation may be facilitated using mechanical and/or hydraulic implements as well as electronically.

17 Claims, 16 Drawing Sheets

(51) Int. Cl.
    *F02D 13/02*     (2006.01)
    *F01L 1/18*     (2006.01)
    *F01L 1/26*     (2006.01)
    *F01L 1/08*     (2006.01)
    *F01L 1/20*     (2006.01)
    *F01L 13/00*     (2006.01)

(52) U.S. Cl.
    CPC . *F01L 1/08* (2013.01); *F01L 1/20* (2013.01); *F01L 1/26* (2013.01); *F01L 13/06* (2013.01); *F01L 2013/103* (2013.01); *F01L 2305/00* (2020.05); *F01L 2800/00* (2013.01); *F01L 2800/08* (2013.01); *F01L 2800/10* (2013.01); *F01L 2820/01* (2013.01); *F01L 2820/033* (2013.01); *F02D 13/028* (2013.01); *F02D 2200/04* (2013.01)

(58) Field of Classification Search
    CPC ............... F01L 2305/00; F01L 2820/01; F01L 2800/10; F01L 2800/00; F01L 1/26; F01L 1/08; F01L 2820/033; F01L 2800/08; F01L 1/20; F01L 2013/103; F01L 13/06; Y02T 10/12
See application file for complete search history.

(56) References Cited

U.S. PATENT DOCUMENTS

| | | | |
|---|---|---|---|
| 5,437,156 A * | 8/1995 | Custer | F01L 13/065 60/611 |
| 5,537,975 A | 7/1996 | Cosma et al. | |
| 6,148,793 A * | 11/2000 | Faletti | F02D 13/04 123/322 |
| 6,868,824 B2 * | 3/2005 | Yang | F02M 26/50 123/321 |
| 7,565,896 B1 * | 7/2009 | Yang | F02D 13/0207 123/321 |
| 10,132,247 B2 * | 11/2018 | Alexandru | F02D 41/221 |
| 10,513,989 B2 * | 12/2019 | Lilly | F02D 13/04 |
| 10,753,289 B2 * | 8/2020 | Lilly | F02D 13/0276 |
| 2002/0023619 A1 * | 2/2002 | Janak | F02B 29/00 123/321 |
| 2003/0015155 A1 | 1/2003 | Turner et al. | |
| 2003/0178002 A1 * | 9/2003 | Israel | F02D 13/04 123/321 |
| 2005/0252484 A1 | 11/2005 | Vanderpoel et al. | |
| 2008/0216795 A1 * | 9/2008 | Dietz | F02B 37/004 123/344 |
| 2011/0197833 A1 | 8/2011 | Vorih et al. | |
| 2012/0024260 A1 | 2/2012 | Groth et al. | |
| 2014/0034010 A1 * | 2/2014 | Serrano | F02D 41/0087 123/324 |
| 2014/0214308 A1 | 7/2014 | Mulloy et al. | |
| 2014/0326212 A1 | 11/2014 | Baltrucki et al. | |
| 2015/0224638 A1 | 8/2015 | Dockter | |
| 2019/0072012 A1 * | 3/2019 | Yang | F01L 1/181 |

FOREIGN PATENT DOCUMENTS

| | | |
|---|---|---|
| JP | H10274067 A | 10/1998 |
| JP | H11510583 A | 9/1999 |
| JP | 2015224638 A | 12/2015 |
| JP | 2018145808 A | 9/2018 |
| WO | 2002095203 A1 | 11/2002 |
| WO | 2008057304 A2 | 5/2008 |

OTHER PUBLICATIONS

Written Opinion for International Application No. PCT/US2018/045264 dated Nov. 28, 2019, 9 pages.

* cited by examiner

SYSTEMS AND METHODS FOR COUNTER FLOW MANAGEMENT AND VALVE MOTION SEQUENCING IN ENHANCED ENGINE BRAKING

CROSS-REFERENCE TO RELATED APPLICATIONS

This application claims priority to U.S. Patent Application Ser. No. 62/540,763, filed on Aug. 3, 2017, titled "METHOD FOR CONTROLLING INTAKE COUNTER FLOW SEEN DURING HPD TRANSIENT," the disclosure and teachings of which are incorporated in their entirety herein by this reference.

FIELD

This disclosure relates generally to systems and methods for operating internal combustion engines and for implementing engine braking actions in internal combustion engines. More particularly, this disclosure relates to systems and methods for managing intake flow path counter flow in enhanced braking systems. This disclosure also relates to systems and methods for controlling valve motion in enhanced engine braking systems.

BACKGROUND

Internal combustion engines typically employ mechanical, electrical or hydro-mechanical valve actuation systems to control the flow of combustible components, typically fuel and air, to one or more combustion chambers during operation. Such systems control the motion and timing of intake and exhaust valves during engine operation and may include a combination of camshafts, cam followers, rocker arms, push rods and other elements (such elements, in combination, constituting a valve train), which are driven by a rotating engine crankshaft. The timing of valve actuation may be fixed by the size and location of the lobes on the camshaft.

During positive power operation, for each full 360-degree rotation of the camshaft, the engine sequentially completes an intake stroke, compression stroke, power or expansion stroke and then an exhaust stroke. During the intake stroke, intake valves are opened to admit fuel and air into a cylinder for combustion. During the compression stroke, both exhaust and intake valves are closed to permit compression by a piston of the air fuel mixture in the combustion chamber. The exhaust and intake valves remain closed as the compressed air/fuel mixture explodes forcing the piston downward in the expansion or power stroke. During the exhaust stroke, exhaust valves are subsequently opened to allow combustion products to escape the cylinder. Valve motion during this four-stroke operation is typically referred to as "main event" operation of the valves.

In addition to positive power main event operation, valve actuation systems may be configured to facilitate "auxiliary events" during auxiliary engine operation. For example, it may be desirable to actuate (lift) the exhaust valves during a compression stroke for compression-release (CR) engine braking, bleeder braking, exhaust gas recirculation (EGR), brake gas recirculation (BGR) or other auxiliary valve events. Other auxiliary valve actuations applied to intake valves are also known in the art. During these auxiliary events, valve timing and motion may be controlled in a different manner compared to the main event operation.

For auxiliary events, "lost motion" devices may be utilized in the valve train to facilitate auxiliary event valve movement. Lost motion devices refer to a class of technical solutions in which valve motion is modified compared to the motion that would otherwise occur as a result of a respective cam surface alone. Lost motion devices may include devices whose length, rigidity or compressibility is varied and controlled in order to facilitate the occurrence of auxiliary events in addition to main event operation of valves.

So-called 4-stroke compression release engine braking, which augments main event valve motion by providing energy dissipation events via controlled exhaust valve lift during each compression stroke—corresponding to every other instance of piston top dead center (TDC)—has long been known. More recent developments in engine braking include enhanced engine braking systems, such as those marketed under the names HIGH POWER DENSITY™ and HPD™ by Jacobs Vehicle Systems, Inc. of Bloomfield, Conn. Examples of such systems and methods are described in U.S. Pat. No. 8,936,006, the subject matter of which is incorporated herein in its entirety. These engine braking systems provide increased energy dissipation, compared to 4-stroke compression release engine braking, by utilizing valve motions that result in energy dissipation events corresponding to every instance of TDC. In these braking systems, a braking "2-stroke" implementation may cancel the main event motions on the intake and exhaust valves using lost motion devices and may add secondary or auxiliary motions to one or more of the intake and/or exhaust valves such that compression release events correspond to each instance of TDC. A variation of "2-stroke" braking is "1.5-stroke" braking in which the main event motion on the exhaust valve is cancelled while adding a secondary braking motion on one more of the exhaust valves. In "1.5-stroke" braking, the intake valve main event motion remains unchanged. Such systems may include a "failsafe" feature in which low lift of the exhaust valve is provided to prevent a completely sealed condition of the cylinder.

State-of-the-art engine braking systems require more precise and complex valve motion deactivation of such braking systems, otherwise loads exceeding steady state may occur on the intake valve train and last for one or more engine cycles. This excessive loading may arise, for example, when the main event exhaust motion has been "lost" or cancelled before a hydraulically actuated braking piston associated with an exhaust valve has been allowed sufficient time to index to its steady state position. This may result in occurrence of the low lift "failsafe" event from the braking rocker to reduce transient intake cylinder pressure. However, such failsafe systems still cannot evacuate as much air from the cylinder as a main event exhaust lift can. As a result, the intake rocker may open one or more valves against higher than normal cylinder pressure, resulting in high load to the intake rocker and valve train, as well as leaving the intake manifold and flow path exposed to a high-pressure pulse, which may lead to undesirable consequences, such as counter flow in the intake manifold and surge of an upstream turbocharger in the intake flow path.

It would therefore be advantageous to provide systems and methods that address the aforementioned shortcoming and others in the prior art.

SUMMARY

According to one aspect, systems and methods for managing excessive intake flow path pressure and counter flow are implemented to support enhanced engine braking applications, such as 2-stroke engine braking implementations where the intake flow path may be exposed to excessive transient pressures in the combustion chamber during activation or deactivation of an engine brake. These systems and methods may utilize and control one or more engine components, such as an intake throttle, exhaust gas recirculation (EGR) valve, intake manifold blow-off valve, compressor bypass valve, exhaust throttle, turbocharger geometry or turbocharger waste gate to effectuate counter flow management separately or in combination.

According to a further aspect, systems and methods are provided for achieving sequential valve motion in which brake motion activation occurs first and then main event deactivation occurs second. This sequential valve motion operates as a proactive measure to prevent excessive intake valve train forces that would otherwise result from premature lift of an intake valve against high combustion chamber pressures or the release of intake counterflow also resulting from high combustion chamber pressures. Such systems and methods ensure that brake motion activation occurs sufficiently prior in time to exhaust valve main event disablement. A brake activation operation occurs a sufficient time (which may be predetermined or based on current engine operating parameters) in advance of the main event deactivation to allow the brake components, such as hydraulic brake actuator pistons, to reach a steady state position before main event deactivation occurs.

According to one aspect, delay between brake activation and main event deactivation may be facilitated using mechanical and/or hydraulic implements. In one example, a solenoid valve may be utilized with a flow restriction for causing the main even deactivation delay. In another example, a single port proportional valve may facilitate delay between pressurization of a collapsing circuit and a braking circuit. In another example, a multiple-port proportional valve may facilitate the delay. In yet another example, a hydraulic passage may be provided of suitable length that the main event deactivation occurs only after an engine brake mechanism (such as a brake piston) is supplied with sufficient hydraulic fluid to reach steady state operation. In another example, a flow restricting device, such as an orifice, may regulate the flow of hydraulic fluid and cause sufficient delay in the main event deactivation operation to ensure that it occurs only after the engine brake mechanism has reached steady state operation.

According to another aspect of the disclosure, the delay may be implemented electronically in an engine control unit (ECU) that controls brake activation solenoids or other electromechanical actuators and main event disablement solenoids or other electromechanical actuator.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto.

FIG. 16A illustrates a "brake off" status. FIG. 16B illustrates a "brake on" status with one outlet of the proportional valve providing flow to activate a braking circuit. FIG. 16C illustrates a "brake on" status with a second outlet providing flow to activate a collapsing circuit.

DETAILED DESCRIPTION

Figure 1:
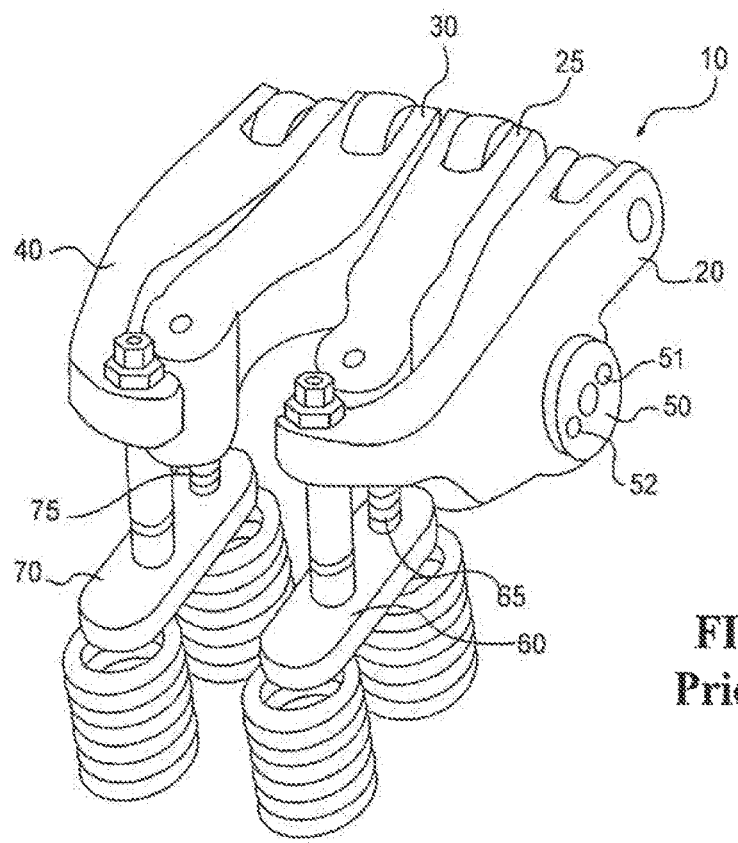
FIG. 1 is a perspective of a prior art enhanced engine braking configuration that is suitable for improvements supporting counter flow management and valve sequencing aspects of the disclosure.

FIGS. 1-4 illustrate aspects of an example valve actuation system for an enhanced braking system, as disclosed in U.S. Pat. No. 8,936,006, which may be adapted and improved in accordance with aspects of this disclosure. Valve actuation system 10 may include a main exhaust rocker arm 20, an engine braking exhaust rocker arm 25 to provide engine braking motion to an exhaust valve, a main intake rocker arm 40, and an engine braking intake rocker arm 30 to provide engine braking motion to an intake valve. The rocker arms 20, 25, 30 and 40 may pivot on one or more rocker shafts 50, which include one or more passages 51 and 52 for providing hydraulic fluid to one or more of the rocker arms.

Figure 2:
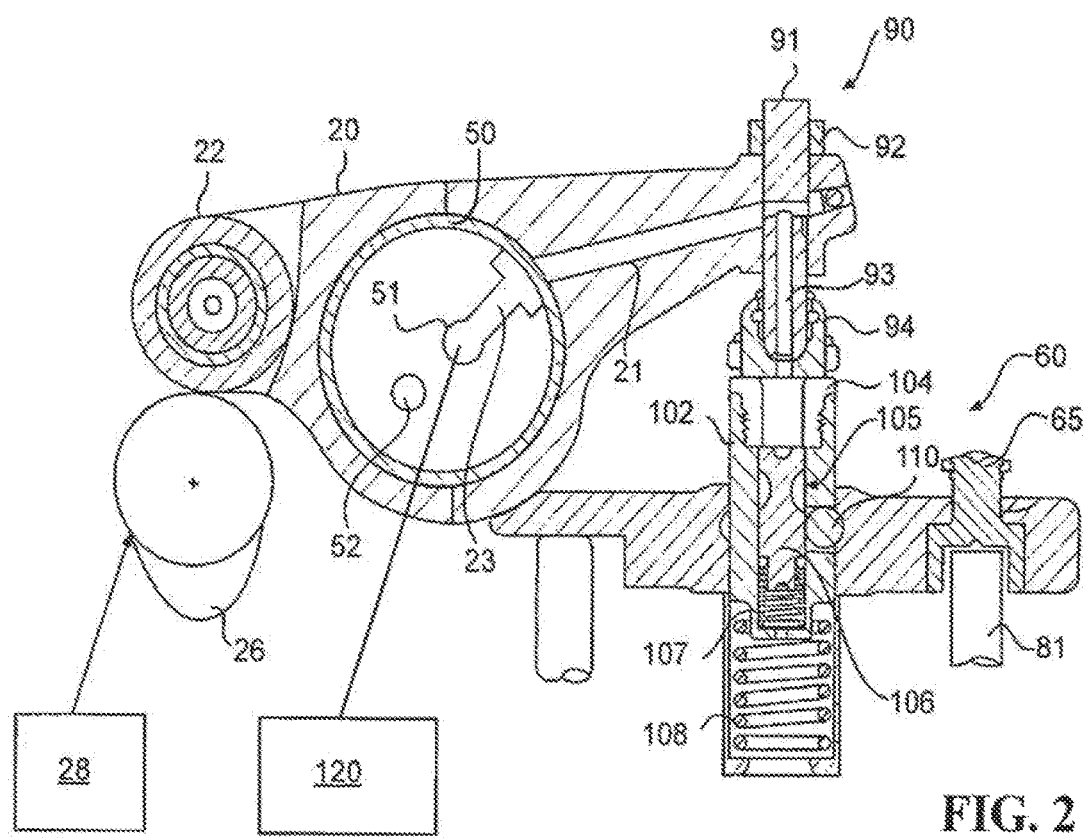
FIG. 2 is a cross-section of a main exhaust or intake valve rocker of the configuration of FIG. 1.

The main exhaust rocker arm 20 may contact an exhaust valve bridge 60, which interacts with ends of exhaust valves 81 (see FIG. 2), and the main intake rocker arm 40 may contact an intake valve bridge 70, which interacts with ends of intake valve stems (not shown). The engine braking exhaust rocker arm 25 may contact a sliding pin 65 provided in the exhaust valve bridge 60, which permits actuation of only a single one of the exhaust valves 81, separately from exhaust valve bridge 60, by the engine braking exhaust rocker arm 25. The engine braking intake rocker arm 30 may contact a sliding pin 75 provided in the intake valve bridge 70, which permits actuation of only a single one of the intake valves, separately from intake valve bridge 70, by the engine braking intake rocker arm 30. Each of the rocker arms 20, 25, 30 and 40 may be actuated by cams and may include a cam roller, for example. The main exhaust rocker arm 20 may be driven during main event motion by a cam that includes a main exhaust bump 26, which may selectively open the exhaust valves during an exhaust stroke for an engine cylinder. Likewise, the main intake rocker arm 40 may be driven during main event motion by a cam which includes a main intake bump which may selectively open the intake valves during an intake stroke for the engine cylinder. Hydraulic fluid may be supplied to the rocker arm 20 from a hydraulic fluid supply (not shown) under the control of a solenoid valve 120. The hydraulic fluid may flow through passages 51, 23 formed in the rocker shaft 50 to a hydraulic passage 21 formed within the rocker arm 20. The arrangement of hydraulic passages in the rocker shaft 50 and the rocker arm 20 shown in FIG. 2 are for illustrative purposes only.

An adjusting screw assembly 90 may be disposed at an end of the rocker arm 20. The adjusting screw assembly may comprise a screw 91 extending through the rocker arm 20 which may provide for lash adjustment, and a threaded nut 92 which may lock the screw 91 in place. A hydraulic passage 93 in communication with the rocker passage 21 may be formed in the screw 91. A swivel foot 94 may be disposed at one end of the screw 91.

The exhaust valve bridge 60 may receive a collapsing or lost motion device or assembly including an outer plunger 102, a cap 104, an inner plunger 106, an inner plunger spring 107, an outer plunger spring 108, and one or more wedge rollers or balls 110. The outer plunger 102 may include an interior bore 105 and a side opening extending through the outer plunger wall for receiving the wedge roller or ball 110. The inner plunger 106 may include one or more recesses shaped to securely receive the one or more wedge rollers or balls 110 when the inner plunger is pushed downward. The central opening of the valve bridge 60 may also include one or more recesses for receiving the one or more wedge rollers or balls 110 in a manner that permits the rollers or balls to lock the outer plunger 102 and the exhaust valve bridge 60 together, as shown in FIG. 2. The outer plunger spring 108 may bias the outer plunger 102 upward in the central opening. The inner plunger spring 107 may bias the inner plunger 106 upward in outer plunger bore.

A main event deactivation circuit may be associated with the main exhaust valve rocker arm 20 and the main intake rocker arm 40 to activate the lost motion device or assembly and thereby deactivate or disable the main event valve motion. Hydraulic fluid may be selectively supplied from a solenoid control valve 120, through passages 51, 21, 23 and 93 to the outer plunger 102. The supply of such hydraulic fluid may displace the inner plunger 106 downward against the bias of the inner plunger spring 107. When the inner plunger 106 is displaced sufficiently downward, the one or more recesses in the inner plunger may register with and receive the one or more wedge rollers or balls 110, which in turn may decouple or unlock the outer plunger 102 from the exhaust valve bridge body 60. As a result, during this "unlocked" state, valve actuation motion applied by the main exhaust rocker arm 20 does not move the exhaust valve bridge 60 downward to actuate the exhaust valves. Instead, this downward motion causes the outer plunger 102 to slide downward within the central opening of the exhaust valve bridge against the bias of the outer plunger spring 108.

In addition to the lost motion device or collapsing mechanism described above, another suitable lost motion device for incorporation into the valve bridges 60, 70 is described in U.S. Pat. No. 9,790,824, the teachings of which are incorporated herein by this reference.

Figure 3:
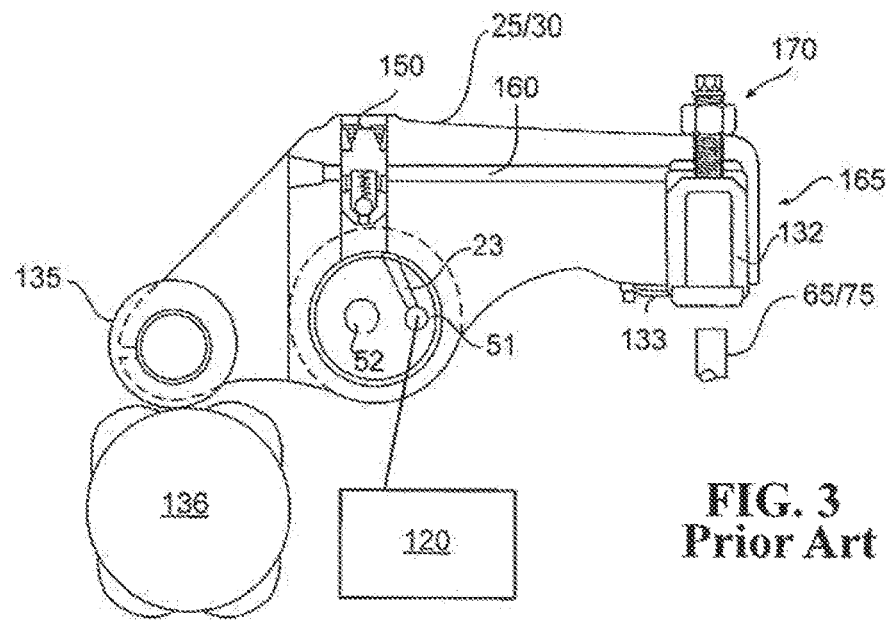
FIG. 3. is a cross-section of an intake or exhaust valve engine brake rocker and brake mechanism of the configuration of FIG. 1.

With reference to FIGS. 1 and 3, the engine braking exhaust rocker arm 25 and engine braking intake rocker arm 30 may include braking mechanisms that incorporate collapsing or lost motion elements such as those provided in the rocker arms illustrated in U.S. Pat. Nos. 3,809,033 and 6,422,186, which are hereby incorporated by reference. The engine braking exhaust rocker arm 25 and engine braking intake rocker arm 30 may each have a selectively extendable actuator or braking piston 132 which may take up a lash space between the extendable actuator pistons and the sliding pins 65 and 75 provided in the valve bridges 60 and 70 underlying the engine braking exhaust rocker arm and engine braking intake rocker arm, respectively.

The rocker arm 25 may include a cam follower 135 which contacts a cam 136, which may have one or more bumps to provide compression release, brake gas recirculation, exhaust gas recirculation, partial bleeder valve actuation and/or other auxiliary valve actuation motions to the exhaust side engine braking rocker arm 25. When contacting the engine braking intake rocker arm 30, the cam 140 may have one, two, or more bumps to provide one, two or more intake events to an intake valve. The engine braking rocker arms 25 and 30 may transfer motion derived from cams 136 to operate at least one engine valve each through respective sliding pins 65 and 75.

The engine braking exhaust rocker arm 25 may be pivotally disposed on the rocker shaft which includes hydraulic fluid passages 51, 52 and 23. The hydraulic passage 23 may connect the hydraulic fluid passage 51 with a port provided within the rocker arm 25. The engine braking exhaust rocker arm 25 (and engine braking intake rocker arm 30) may receive hydraulic fluid through the rocker shaft passages 51 and 23 under the control of a solenoid hydraulic control valve 120. It is contemplated that the solenoid control valve 120 may be located on the rocker shaft 50 or elsewhere.

The engine braking rocker arm 25, 30 may also include a control valve 150. The control valve 150 may receive hydraulic fluid from the rocker shaft passage 23 and is in communication with a fluid passageway 160 that extends through the rocker arm 25 to a lost motion piston assembly 165. The control valve 150 may be slidably disposed in a control valve bore and include an internal check valve which only permits hydraulic fluid flow from passage 23 to passage 160. The design and location of the control valve 150 may be varied without departing from the intended scope of the present invention. For example, it is contemplated that in an alternative embodiment, the control valve 150 may be rotated approximately 90 degrees such that its longitudinal axis is substantially aligned with the longitudinal axis of the rocker shaft 50.

A second end of the engine braking rocker arm 25, 30 may include a lash adjustment assembly 170, which includes a lash screw and a locking nut located above the lost motion piston assembly 165. The lost motion piston assembly 165 may include an actuator piston 132 slidably disposed in a bore provided in the head of the rocker arm 25. The bore communicates with fluid passage 160. The actuator piston 132 may be biased upward by a spring 133 to create a lash space between the actuator piston and the sliding pin 65.

A hydraulic brake activation circuit may be implemented in association with the engine braking rocker arm 25, 30. Application of hydraulic fluid to the control valve 150 from the passage 23 may cause the control valve to index upward against the bias of the spring above it, as shown in FIG. 3, permitting hydraulic fluid to flow to the lost motion piston assembly 165 through passage 160. The check valve incorporated into the control valve 150 prevents the backward flow of hydraulic fluid from passage 160 to passage 23. When hydraulic fluid pressure is applied to the actuator piston 132, it may move downward against the bias of the spring 133 and take up any lash space between the actuator piston and the sliding pin 65. In turn, valve actuation motion imparted to the engine braking rocker arm 25 from the cam bumps may be transferred to the sliding pin 65 and the exhaust valve below it. When hydraulic pressure is reduced in the passage 23 under the control of the solenoid control valve 120, the control valve 150 may collapse into its bore under the influence of the spring above it. Consequently, hydraulic pressure in the passage 160 and the bore may be vented past the top of the control valve 160 to the outside of the rocker arm 25. In turn, the spring 133 may force the actuator piston 132 upward so that the lash space 104 is again created between the actuator piston and the sliding pin 650. In this manner, under control from the brake activation circuit, the exhaust and intake engine braking rocker arms 25 and 30 may selectively provide valve actuation motions to the sliding pins 65 and 75, and thus, to the engine valves disposed below these sliding pins.

Figure 4:
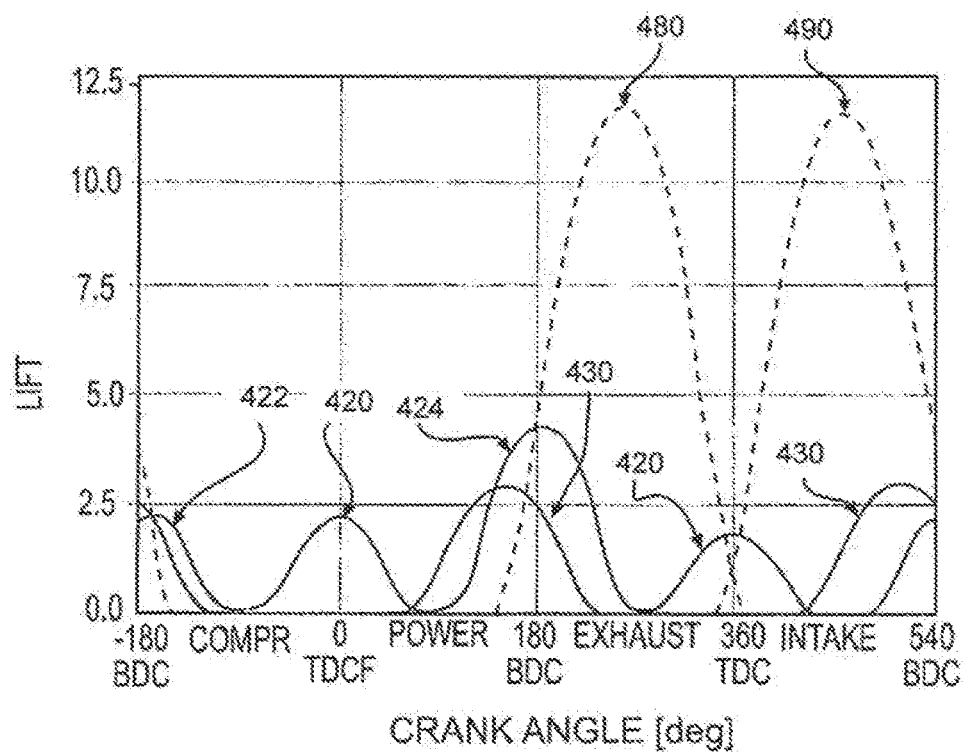
FIG. 4. is a graph of prior art intake and exhaust valve lift as a function of crankshaft angle for main and auxiliary (braking) valve events.

FIG. 4 is a graphic representation of intake and exhaust valve motion that may be achieved by an enhanced engine braking system as described above. The main exhaust rocker arm 20 may be used to provide a main exhaust event 480, and the main intake rocker arm 40 may be used to provide a main intake event 490 during positive power operation.

During engine braking operation, according to one embodiment, the engine braking exhaust rocker 25 may facilitate auxiliary exhaust valve motion and events to provide enhanced engine braking. These may include a standard BGR valve event 422, an increased lift BGR valve event 424, and two compression release valve events 420. The engine braking intake rocker 30 may also facilitate auxiliary intake valve motion and events to provide enhanced engine braking. These may include two intake valve events 430 which lift the intake valve to provide additional air to the cylinder for engine braking. In this embodiment, both exhaust 480 and intake main events 490 are deactivated or lost according to the lost motion or collapsing mechanisms described above. In accordance with these valve events 420, 422, 424, 430, the system may provide full two-cycle or "2-stroke" compression release engine braking.

With continued reference to FIG. 4, in a first alternative, motions of only the exhaust valves are modified to provide engine braking. In this alternative, no engine braking intake rocker arm is provided nor is a lost motion or collapsing component provided in the intake valve bridge. Thus, a lost motion or collapsing mechanism is only provided on the exhaust valve bridge and the engine braking mechanism is provided only on the engine braking exhaust rocker arm. In this case, the main intake event 490 is not lost and no intake braking valve events 430 are provided, whereas the exhaust main event 480 is lost, and, in the illustrated example, the four exhaust engine braking valve events 420, 422, 424 are provided. In this manner, the system provides so-called "1.5-stroke" compression release engine braking. Such a system provides significant engine braking power comparable to a 2-stroke system, but with reduced cost due to the unmodified intake valve actuation components.

Figure 5:
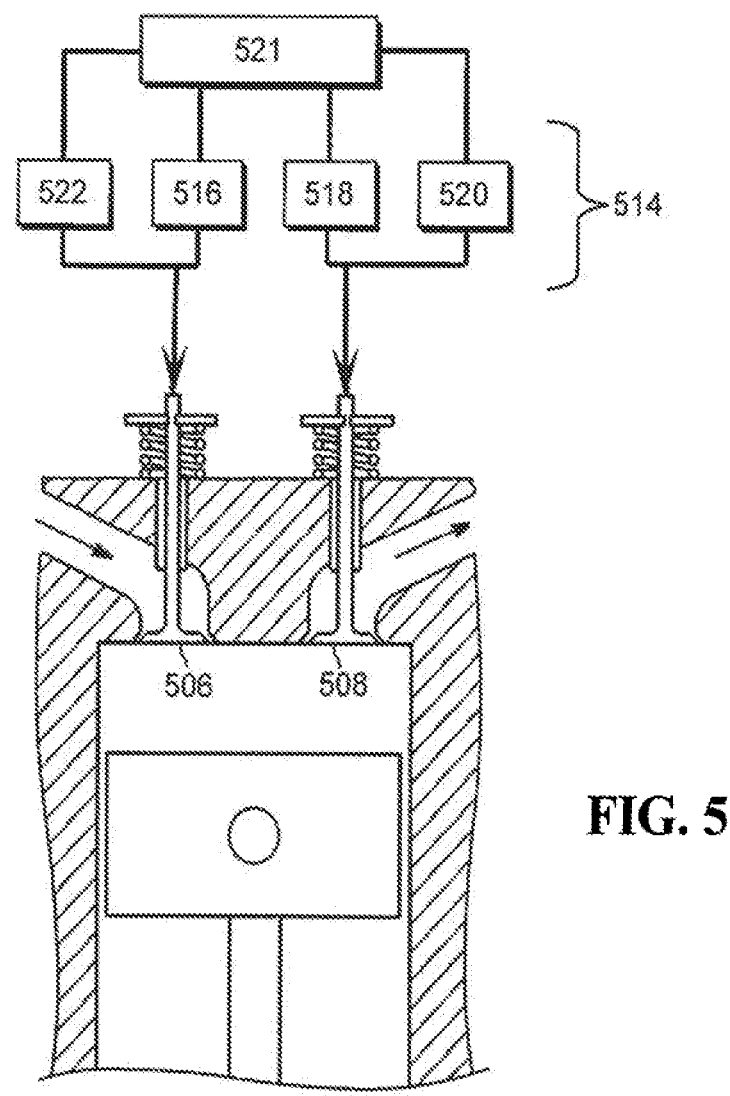
FIG. 5 is a schematic illustration of engine, valve actuation and control components in an example system that is suitable for implementing counter flow management and sequencing aspects described herein.

FIG. 5 is a schematic block diagram including a cross-sectional view of an engine cylinder and illustrating valve actuation apparatus and system suitable for implementing the improvements in counter flow management and valve sequencing disclosed herein. An engine controller 521 may be communicatively associated with a number of valve actuating subsystems, generally represented by 514. The intake valve 506 and exhaust valve 508 may be opened and closed by these valve actuating subsystems to implement main event and auxiliary (braking) valve motion as described above. These may include a positive power or main event intake valve actuating subsystem 516, an engine braking intake valve actuating subsystem 522, a positive power or main event exhaust valve actuating subsystem 518, and an engine braking exhaust valve actuating subsystem 520. The positive power valve actuating subsystems and the engine braking valve actuating subsystems may be integrated into a single system in some embodiments or separate in others.

The valve actuating subsystems 514 may be controlled by a controller 521 to selectively control, for example, amount and timing of the engine valve actuations, including the controlled signaling or energization of solenoids or other control elements to cause main event valve actuations and engine braking valve actuations. The controller 521 may comprise any electronic, mechanical, hydraulic, electrohydraulic, or other type of control device for communicating with the valve actuating subsystems 514 and causing some or all of the possible intake and exhaust valve actuations to be transferred to the intake valve 506 and the exhaust valve 508. The controller 521 may include a microprocessor and instrumentation linked to other engine components to determine and select the appropriate operation of the engine valves based on inputs indicative of various engine operating parameters such as engine speed, vehicle speed, oil temperature, coolant temperature, manifold (or port) temperature, manifold (or port) pressure, cylinder temperature, cylinder pressure, particulate information, other exhaust gas parameters, driver inputs (such as requests to initiate engine braking), transmission inputs, vehicle controller inputs, engine crank angle, and various other engine and vehicle parameters. In particular, and in accordance with embodiments described in further detail below, the controller may activate the engine braking exhaust valve actuating subsystem 520 and the engine braking intake valve actuating subsystem 522 in response to a request for engine braking.

Figure 6:
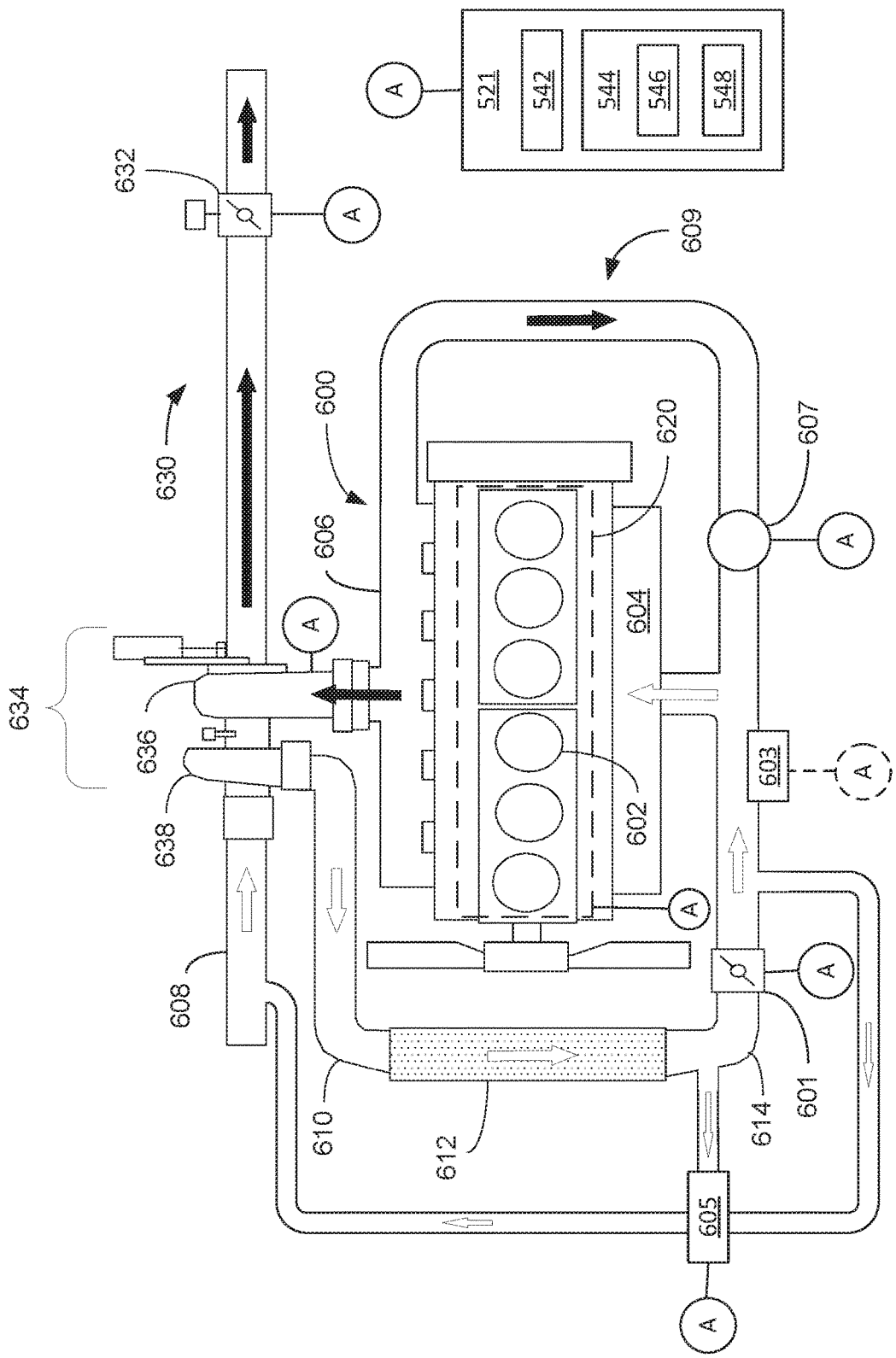
FIG. 6 is a schematic illustration of engine components and subsystems in an example system that is suitable for implementing counter flow management aspects described herein.

Referring now to FIG. 6, an internal combustion engine 600 is shown operatively connected to a number of other engine support subsystems and components that may be utilized for intake counter flow control in accordance with aspects of the present disclosure. The internal combustion engine 600 comprises a plurality of cylinders 602, an intake manifold 604 and an exhaust manifold 606. FIG. 6 also schematically illustrates an engine braking subsystem 620, which may comprise components described above relative to FIGS. 1-4, for actuating one or more valves to achieve engine braking according to signals provided by controller 521, for example, to solenoid components 120 (FIGS. 2 and 3) for controlling main event and engine brake valve actuation. The exhaust system 630 may comprise an exhaust throttle or exhaust braking subsystem 632 and a turbocharger 634. As known in the art, the turbocharger 634 may comprise a turbine 636 operatively connected to a compressor 638 in which exhaust gases (illustrated by the black arrows) output by the exhaust manifold 606 rotate the turbine 636, which in turn, drives the compressor 638. Turbocharger 634 may be a variable geometry turbocharger (VGT) permitting variation of the turbocharger geometry under control of the controller 521. The geometric variation may include variable vanes (i.e., sliding or rotating vanes) to direct airflow having and/or variable nozzles having fixed vanes to direct airflow and a sliding housing to vary airflow. Furthermore, the turbocharger 634 may comprise a wastegate (internal or external) that may be used to divert exhaust gases away from the turbine 636 and directly into the exhaust system 630. The exhaust braking subsystem 632 may comprise any of a number of commercially available exhaust brakes. Exhaust system 630 may also comprise an exhaust gas recirculation (EGR) system 609 for recirculating exhaust gases to the engine intake. An EGR valve 607 may be operatively connected to the controller 521 and may be modulated in response to the controller 521 to achieve counter flow management in accordance with aspects of the disclosure. Collectively, the exhaust manifold 606, turbocharger turbine 636, exhaust system 630 and EGR system 609 may constitute an exhaust flow path.

As further shown in FIG. 6, various components may form an intake system, or intake flow path, that provide air to the intake manifold 604. In the illustrated example, an inlet pipe 608 provides ambient air to the compressor 638 that, in turn, provides pressurized air through a compressor outlet pipe 610 to a charge air cooler 612 that cools down the pressurized air. The output of the charge air cooler 612 routes the cooled, compressed air to an intake manifold inlet 614. As known in the art, the level of compression (or boost pressure) provided by the compressor 638 depends upon the pressure of the exhaust gases escaping through the exhaust system 630. The intake flow path may further comprise an intake throttle 601 disposed within the intake manifold inlet pipe 614, a blow off valve 603 in communication with the intake manifold inlet pipe 614 and/or a compressor bypass valve 605 in communication with the intake manifold inlet pipe 614 and the inlet pipe 608.

As further shown in FIG. 6, a controller 521 is provided and operatively connected via the connection points referenced "A" in FIG. 6 to the braking subsystem 620, the exhaust braking subsystem 632 and other engine subsystems and components, including the intake throttle 601, EGR valve 607, intake manifold blow off valve 603, compressor bypass valve 605 and turbocharger 634. The circled "A" reference denotes an operative and communicative connection. The controller connection with the blow off valve 603 is illustrated as being optional (i.e., in dashed lines) to the extent that the blow off valve 603 may be an active blow off valve capable of being directly controlled by the controller 521, or a passive blow off valve, in which case no control signals from the controller 521 are provided. In an embodiment, the connections between the controller 521 and noted components may be configured to convey signals from sensing elements integrated with the components and which generate signals to the controller 521. In practice, though not illustrated in FIG. 6, the connections to the various components may be to various control elements (such as, but not limited to, integrated or external linear or rotary actuators, hydraulic control valves, etc.) used to control the respective components responsive to signals from the controller 521. In this manner, the controller 521 controls operation of these components and sub systems.

In the illustrated embodiment, the controller 521 may comprise a processor or processing device 542 coupled a storage component or memory 544. The memory 544, in turn, comprises stored executable instructions and data, which may include a counter flow management module 546 and/or a valve actuation sequencing module 548. In an embodiment, the processor 542 may comprise one or more of a microprocessor, microcontroller, digital signal processor, co-processor or the like or combinations thereof capable of executing the stored instructions and operating upon the stored data. Likewise, the memory 542 may comprise one or more devices such as volatile or nonvolatile memory including but not limited to random access memory (RAM) or read only memory (ROM). Processor and storage arrangements of the types illustrated in FIG. 6 are well known to those having ordinary skill in the art. In one embodiment, the processing techniques described herein are implemented as a combination of executable instructions and data within the memory 544 executed/operated upon by the processor 542. As an example, the controller 521 may be implemented using an engine control unit (ECU) or the like, as known in the art.

While the controller 521 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the controller 521 may include a greater or lesser number of components than those illustrated. Once again, those of ordinary skill in the art will appreciate the wide number of variations that may be used is this manner. Further still, although a single controller 521 is illustrated in FIG. 6, it is understood that a combination of such processing devices may be configured to operate in conjunction with, or independently of, each other to implement the teachings of the instant disclosure.

Figure 7:
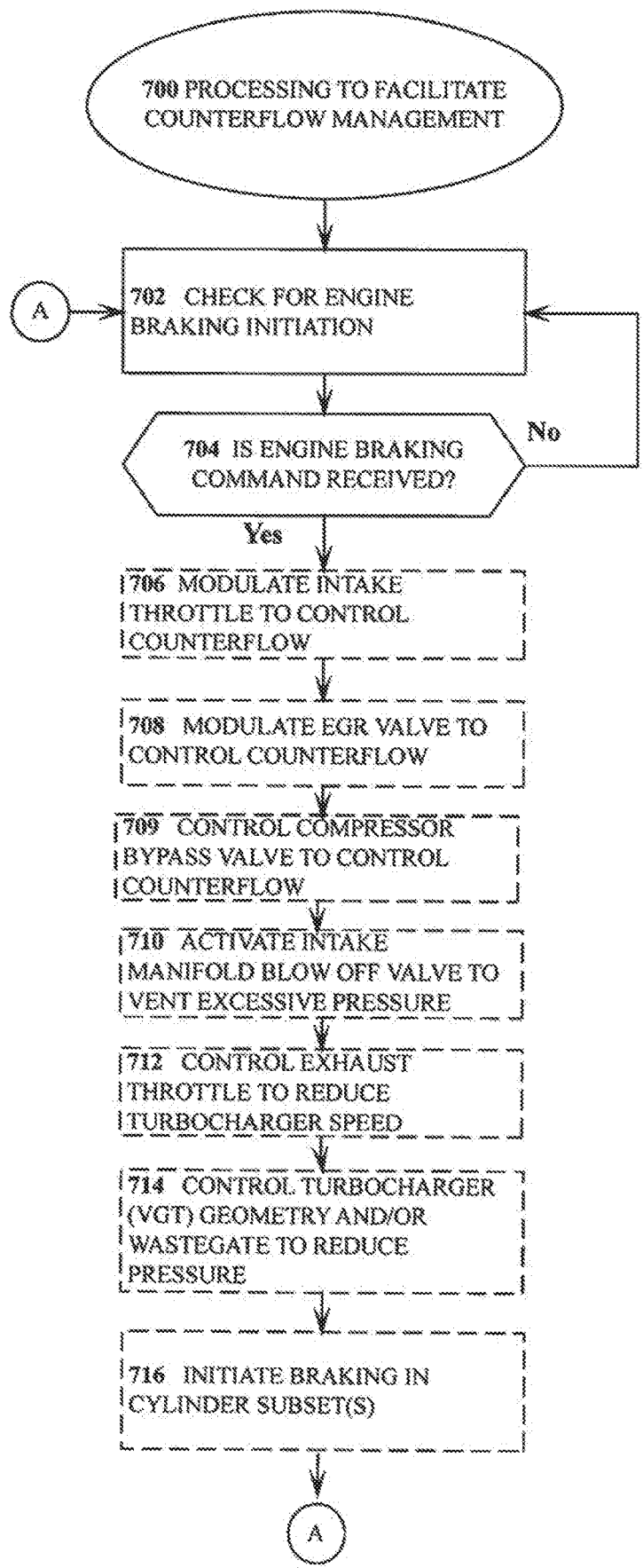
FIG. 7 is a process flow illustrating example methods of managing intake counter flow and pressure according to aspects of the disclosure.

FIG. 7 illustrates example processing 700 in accordance with aspects of the instant disclosure. In particular, the processing illustrated in FIG. 7 may be implemented by the controller 521 as described above. Beginning at block 702, the controller checks for engine brake activation. As noted above, such a request may be provided in the form of a user input such as through activation of a switch or other user-selectable mechanism as known in the art. The process checks at decision 704 if an engine brake command has been received. If not, the process returns to step 702. If a command is received, the process proceeds to one or more counter flow management control steps. As will be appreciated, and as suggested by the dotted lines around these steps, the steps may be performed in combination or separately in a given control process.

The various components illustrated in FIG. 6, i.e., the intake throttle 601, the EGR valve 607, the compressor bypass valve 605, blow off valve 607, exhaust throttle 632 or turbocharger 634, may be considered airflow management devices. Additionally, such airflow management devices typically have steady state operation or are configured in a steady state position during auxiliary engine operation such as engine braking. In order to manage or mitigate the effects of counter flow during transition from positive power to auxiliary engine operations such as engine braking, the noted airflow management devices, either individually or in combination, may be controlled to assume operation or configuration other than that normally employed during such steady state operation, as described below. TABLE A below illustrates an example configuration for the various airflow management devices of FIG. 6, including example positions at steady state, transient and during a braking operation.

TABLE A

| Airflow Management Device | Typical Steady State Positive Power Position | Transient Position | Braking Position |
| --- | --- | --- | --- |
| Intake throttle | OPEN | CLOSED | OPEN |
| EGR valve | OPEN or CLOSED | More OPEN than during positive power More OPEN than Braking | Can be OPEN or CLOSED |
| CBP valve | CLOSED | OPEN | CLOSED |
| Exhaust throttle | OPEN | CLOSED | OPEN |
| VGT position | OPEN or CLOSED | More OPEN than during positive power More OPEN than Braking | Can be OPEN or CLOSED |
| Wastegate | OPEN or CLOSED | More OPEN than during positive power More OPEN than Braking | Can be OPEN or CLOSED |
| Blow Off Valve | CLOSED | OPEN | CLOSED |

As is apparent from TABLE A, the airflow management devices may have different operating positions during steady state operation, transition to/from steady state to braking, and braking steady state operation.

With reference one again to FIG. 7, if an engine braking command has been received, processing may continue at step 706 where the intake throttle 601 (refer additionally to FIG. 6) is used to control counter flow. In this case, the intake throttle is controlled to assume a position in which flow through the intake manifold inlet pipe 614 is relatively restricted and therefore below a flow level typically employed during steady state engine braking, i.e., the throttle is more closed. In this manner, any counterflow introduced into the intake manifold is effectively reduced from propagating all the way to the turbocharger 634.

Alternatively, or additionally, processing may continue at step 708 where the EGR valve 607 is used to control counter flow. In this case, the EGR valve 607 is controlled to increase communication between the exhaust flow path (the exhaust manifold 606) and the intake flow path (the intake manifold 604) as compared to the level of communication typically employed during steady state engine braking, i.e., the EGR valve 607 is more open. Controlled in this manner, the EGR valve 607 effectively establishes a larger volume to receive any intake counterflow, thereby diminishing its counter flow effect on the turbocharger compressor.

Alternatively, or additionally, processing may continue at step 709 where the compressor bypass valve is controlled to decrease boost pressure provided by the turbocharger to a lower level as compared to boost pressure typically encountered during steady state engine braking. In this case, the compressor bypass valve is opened more to permit the pressurized air output by the turbocharger 634 to be rerouted to intake inlet 608. In this manner, pressure in a given cylinder is reduced prior to initiation of engine braking, thereby decreasing the charge in the cylinder that would otherwise potentially manifest as a pressure impulse (intake counterflow). The compressor bypass valve may also be used to redirect intake counterflow around the compressor to the intake inlet.

Alternatively, or additionally, processing may continue at step 710 where the intake manifold blow-off valve 603 may be activated, either under control of controller 521 or independently. In the case of an actively controlled blow off valve 603, the controller instructs the blow off valve to open such that any counterflow may be immediately vented out of the intake manifold 604. Alternatively, in the case of a passive blow off valve 603, the blow off valve is configured (prior to auxiliary operation of the engine) to open whenever pressure within the intake flow path exceeds a predetermined threshold. For example, the predetermined threshold can be set to a level lower than a pressure level in the intake manifold that is known to cause unacceptable counterflow back to the turbocharger 634. In this case, operation of the blow off valve occurs independent of the controller 512.

Alternatively, or additionally, processing may continue at step 712 where the exhaust throttle 632 may be utilized to reduce the speed of the turbocharger and boost pressure provided by the turbocharger to a lower level as compared to boost pressure typically encountered during steady state engine braking. In this case, the exhaust throttle 632 is more closed to slow the turbocharger and thereby reduce boost pressure to the cylinder, which also decreases the charge in the cylinder that would otherwise potentially manifest as a pressure impulse (intake counterflow).

Alternatively, or additionally, processing may continue at step 714 where the controller 521 may control the turbocharger 634, including its geometry and/or an associated wastegate to reduce boost pressure which may subsequently reduce cylinder pressure and the severity of the subsequent high-pressure pulse in the intake flow path. For example, in the case of a variable geometry turbocharger, fully opening the turbocharger rack will reduce the speed of the turbocharger and thereby reduce the boost pressure. In addition, for turbochargers that use an active wastegate system (either internal or external to the turbocharger), the wastegate may be opened to once again reduce speed of the turbocharger and thereby reduce the boost pressure, thus achieving the same effect.

Alternatively, or additionally, processing may continue at step 716 where counter flow in the intake manifold may be further controlled by initiating braking in only a subset of the cylinders in the engine, as will be explained in more detail with reference to FIG. 8.

As will be recognized by those of ordinary skill in the art, the above-described steps may be performed reactively in response to sensed parameters in the engine system, such as in response to a threshold pressure being sensed in the intake manifold, or may be performed proactively, for example, prior to control steps, such as activation of an engine braking system and/or valve actuation system that may cause counter flow and/or a pressure increase in the intake manifold. For example, as described above relative to FIGS. 1-4, engine braking in the illustrated system is accomplished by deactivating main event motion for the exhaust valve(s) and activating braking motion for at least one exhaust valve. In this case, the below-described mitigation techniques are preferably performed no later than the deactivation of main event motions for the exhaust valve(s). In this manner, the airflow management components can be configured or operated in a manner such that they are prepared to mitigate any potential counterflow in the intake flow path.

Figure 8:
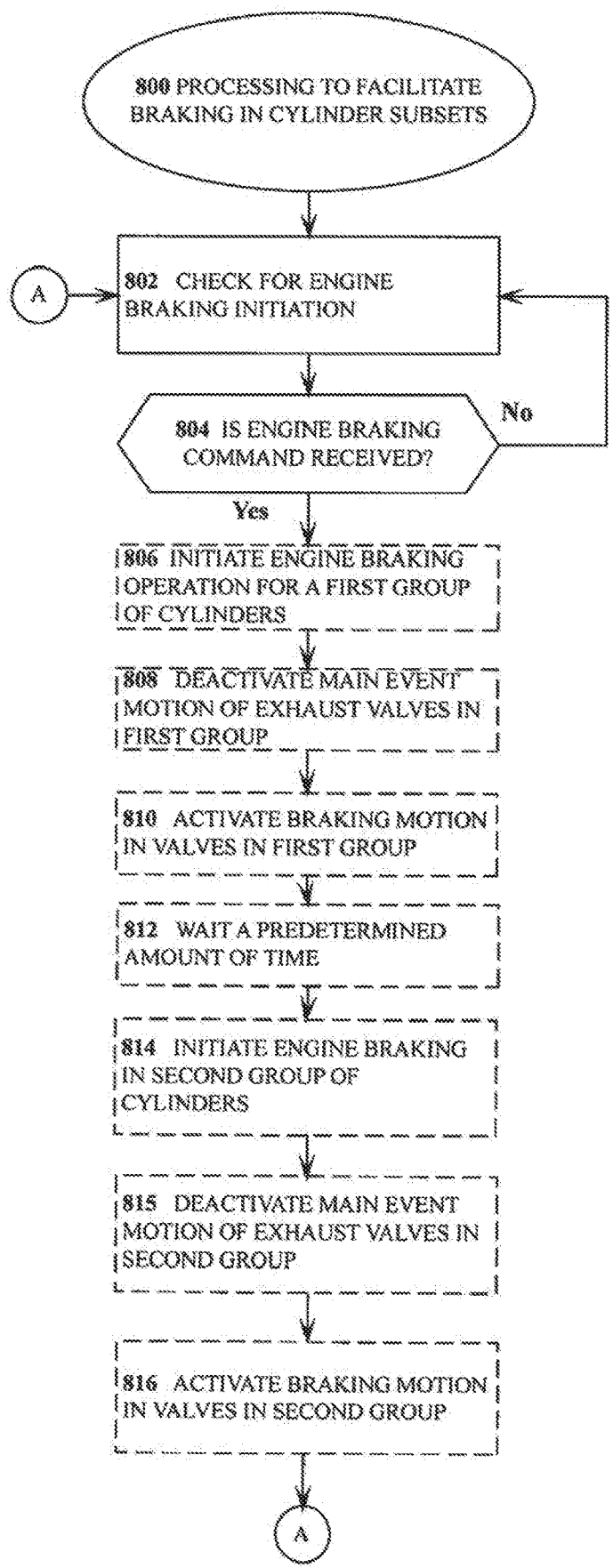
FIG. 8 is a process flow illustrating an example method of managing intake counter flow using engine braking in cylinder subsets.

FIG. 8 is a process flow illustrating processing 800 for an example method of facilitating braking in cylinder subsets. Beginning at block 802, the controller checks for engine brake activation. As noted above, such a request may be provided in the form of a user input such as through activation of a switch or other user-selectable mechanism as known in the art. The process checks at decision 804 if an engine brake command has been received. If not, the process returns to step 802. If a command is received, the process, under control from controller 521 (FIGS. 5 and 6) proceeds at step 806 to initiate engine braking operations, as described above, in a first group of cylinders. At step 808, main event motion is deactivated in the first group (one or more) of cylinders. At step 810, braking motion is activated in the exhaust, and possibly one or more of the intake valves in the first group of cylinders. As will be recognized, this measure of braking in a subset of the engine cylinders results in a lower maximum volume of air and thus a lower peak pressure impulse to which the intake manifold and upstream components may be exposed. At step 812, a delay of a predetermined amount of is allowed to expire following initiation of engine braking for the first group of cylinders. Preferably, the predetermined period of time is sufficiently long enough to permit any intake manifold pressure impulse resulting from activation of engine braking for the first group of cylinders to dissipate. Thereafter, at step 814, engine braking in a second group (one or more) of cylinders, which may include at least one cylinder not included in the first group, may be initiated. Thus, at step 817 main event motion is deactivated in the second group of cylinders and at step 816, braking motion is activated in the at least one exhaust valve associated with the cylinders in the second group. Once again, by staging the first and second groups of cylinders in this manner, lower peak pressure impulses will be realized as compared to simultaneous initiation of engine braking in all cylinders. Additionally, though the example illustrated in FIG. 8 described two groups of cylinders, it will be appreciated that a larger number of groups could be employed. For example, in an engine comprising N cylinders, any number of groups from 2, 3 . . . N-1 or N groups of cylinders could be used (the example of N groups corresponding to the staged activation of engine braking for all N cylinders separately).

Figure 9:
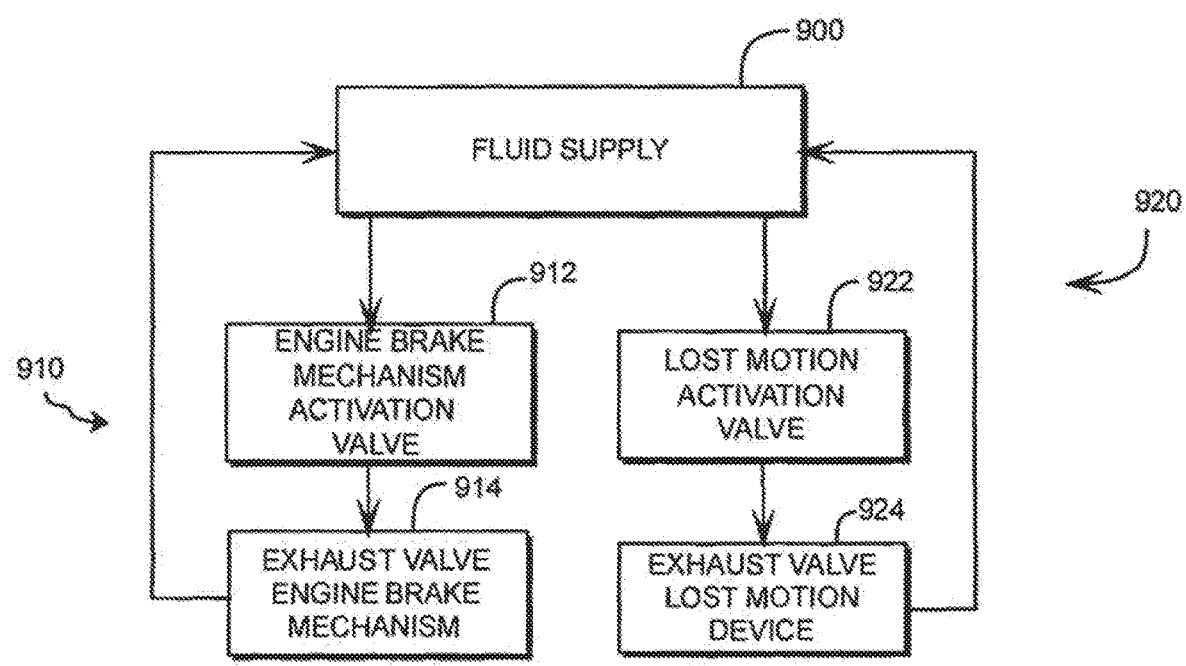
FIG. 9 is a schematic block diagram of an example apparatus and system for sequencing valve events in an engine brake mechanism and a lost motion device according to aspects of the disclosure.

FIG. 9 is a schematic block diagram of an example hydraulic apparatus and system for sequencing valve events in a brake mechanism and a lost motion device according to aspects of the disclosure. A fluid supply 900 may feed an engine brake mechanism activation circuit 910 and a lost motion or collapsing device activation circuit 920. As used herein, a circuit comprises a hydraulic circuit used to supply hydraulic fluid to a given brake mechanism or lost motion/collapsing mechanism. An engine brake mechanism activation valve 912 may control flow to an exhaust valve brake mechanism 914 for activation thereof. Fluid returns to the fluid supply 900 after flow thru the exhaust valve engine brake mechanism 914. A lost motion activation valve 922 may control flow to an exhaust valve lost motion device 924. Fluid returns to the fluid supply 900 after flow thru the exhaust valve lost motion device 924. As will be understood, the functions of the valves 912 and 922 may be separately controlled, for example with separately controlled solenoid valves, or may be integrated in a single valve, such as a single solenoid valve, single port proportional valve or multiple port proportional valve, each with branched flow paths corresponding to the circuits 910 and 912, as will be described.

Figure 10:
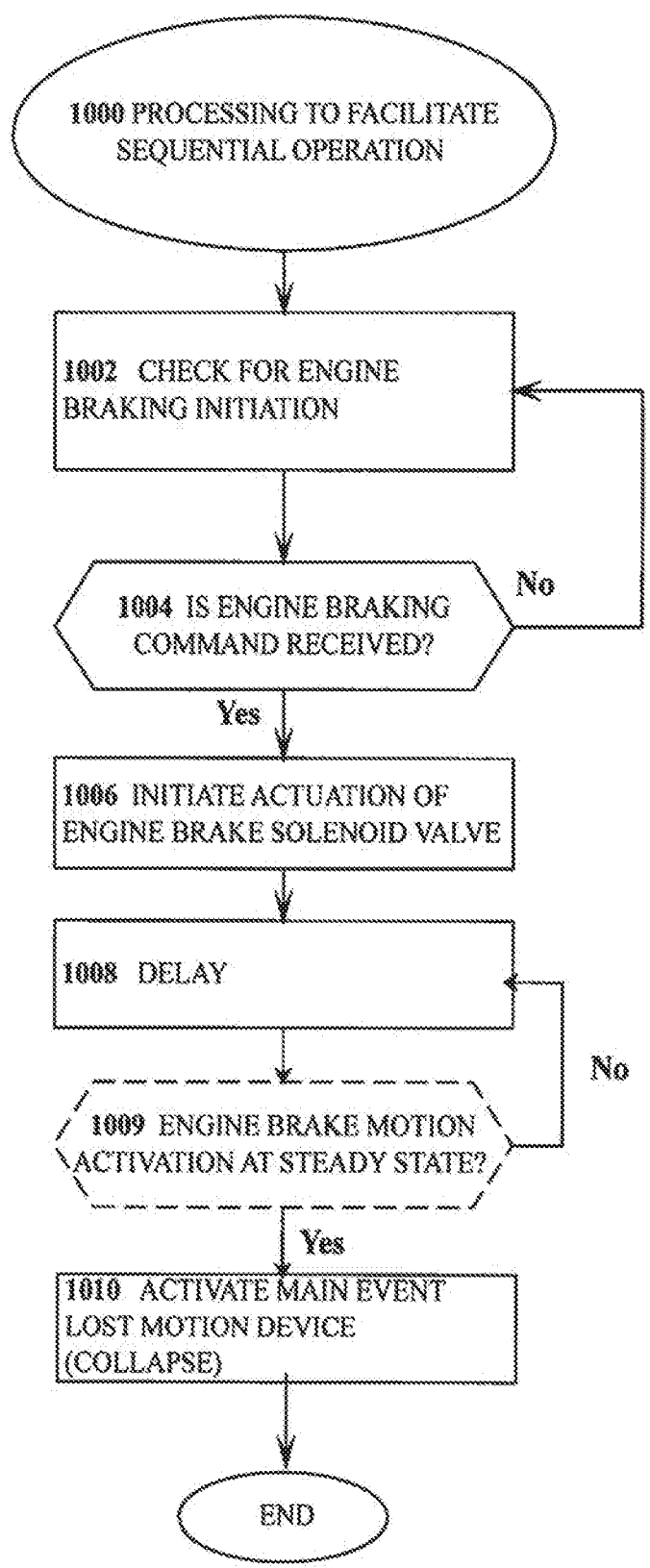
FIG. 10 is a process flow illustrating a method for a sequencing valve events according to aspects of the disclosure.

FIG. 10 is a process flow illustrating processing 1000 in a method for a sequencing valve events according to aspects of the disclosure. Beginning at block 1002, the controller checks for engine brake activation. The process checks at decision 1004 if an engine brake command has been received. If not, the process returns to step 1002. If an engine braking command is received at step 1004, processing continues at step 1006 where one or more control elements, for example an engine brake solenoid valve, are actuated under control of engine controller 521 to the engine brake mechanism. In an embodiment, the engine brake mechanism will enter a transient state in which engine brake mechanism is not capable of performing engine braking, and thereafter enter a steady state in which the engine brake mechanism is ready to perform engine braking. Processing continues at step 1008 where a delay is incurred prior to activation of the lost motion mechanism at step 1010. In one embodiment, the delay may be a fixed, predetermined amount of time based on knowledge of how long it takes the engine brake mechanism to reach its steady state, as described above. In another embodiment, the delay incurred at step 1008 may be determined according to an operating parameter of the engine. Such engine parameter may include, but are not limited to, engine speed, hydraulic fluid (oil) temperature and/or pressure. For example, engine speed and/or oil pressure are operating parameters that may be utilized as inputs for determining the amount of delay. Oil pressure typically increases with engine speed. At low engine speeds, such as 1000 rpm, the time for the brake mechanism to reach steady state may be slower than at higher engine speeds. Thus, at higher engine speeds, the system may determine a shorter delay between brake activation and main event exhaust deactivation. For further example, oil temperature may be another operating parameter used to determine delay. Typically, colder oil temperature will result in higher viscosity and thus slower activation of the brake mechanism. For very cold, subzero temperatures the activation time of the brake mechanism could be noticeably longer as compared to a system having higher temperature oil. Conversely, hotter operating temperatures will result in more rapid operation of the brake mechanism. Thus, the system may utilize fluid temperatures as an operating parameter on which to base determinations of delay. As will be recognized, temperatures of other fluids that corelate to hydraulic fluid or oil temperature may also be used as operating parameters. For example, coolant temperature may corelate closely with oil temperature and may thus be used as an operating parameter for delay determination. Additionally, or as a further alternative, as illustrated by step 1009, the delay may be based on a determination whether the engine brake mechanism has reached steady state deployment, such determination being determined according to feedback provided from the engine brake mechanism. As will be recognized, this sequence will ensure that the engine brake mechanism is in a steady state, rather than a transient state, before the main event motion of the associated exhaust valve(s) is lost through activation of the lost motion/collapsing device. Various embodiments of structures that may be used to achieve the sequencing described relative to FIG. 10 are further described below relative to FIGS. 11-18.

Figure 11:
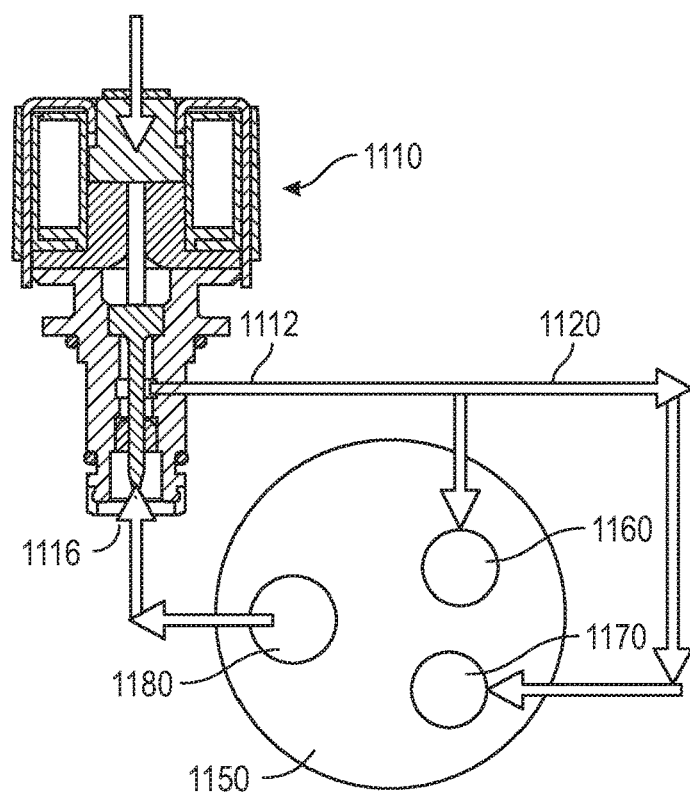
FIG. 11 is a schematic diagram of conventional hydraulic circuits for controlling flow in a brake mechanism activation circuit and a lost motion device (main event collapsing) circuit, including collapsing circuit and braking circuit passages in a rocker shaft, shown in cross section.

FIG. 11 is a schematic diagram of conventional hydraulic circuits for controlling flow in a brake mechanism activation circuit and a lost motion device (main event collapsing) circuit, including collapsing circuit and braking circuit passages in a rocker shaft, shown in cross section. In this case, a conventional solenoid feeds two circuits in a rocker shaft. In particular, a solenoid valve 1110, having an outlet 1112 and inlet 1116, which may be controlled according to signals from a control unit (not shown), is provided. Rocker shaft 1150 may include a braking circuit passage 1160 and a lost motion or collapsing circuit passage 1170. A supply passage 1180 supplies fluid to the solenoid inlet 1116. In this conventional supply configuration, the solenoid valve 1110 provides fluid to a braking circuit and a main event collapsing circuit, without regard to sequencing of the braking and main event collapse valve actions.

Figure 12:
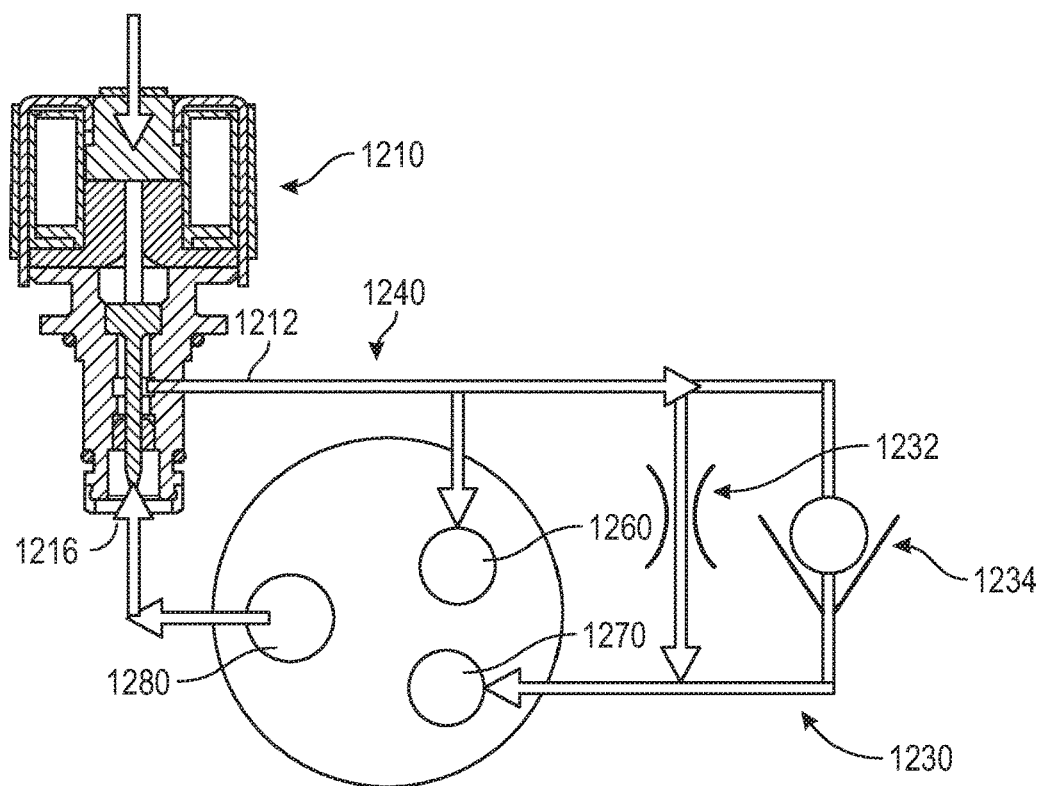
FIG. 12 is a schematic diagram of example hydraulic components for implementing a braking circuit with preferential supply and a main event collapsing circuit controlled by a solenoid valve in an apparatus and system for sequencing valve events according to aspects of the disclosure.

FIG. 12 is a schematic diagram of example hydraulic components for implementing a braking circuit with preferential supply and a main event collapsing circuit controlled by a solenoid valve in an apparatus and system for sequencing valve events according to aspects of the disclosure. In this example, the main event collapsing circuit 1230 includes a flow restricting device 1232, such as an orifice or narrow passage to slow energization (pressurization) of the collapsing circuit passage 1270 and thereby delay activation of the main event collapse. As will be recognized, as an alternative to flow restricting device 1232, a fluid passage of suitable length may be provided to implement a delay. The braking circuit 1240 may receive unrestricted flow from the solenoid valve 1210. This configuration may be used to ensure that the braking mechanism reaches steady state prior to main event collapse, thereby preventing opening of the intake valve(s) when cylinder pressures are excessive. A check valve 1234 may be provided to facilitate backflow and unrestricted drain from the collapsing circuit 1234 back to the solenoid valve 1210 during turn off of the braking mechanism. Re-activation of the main event motion may thus occur prior to deactivation (turn off) of the braking mechanism.

Figure 13:
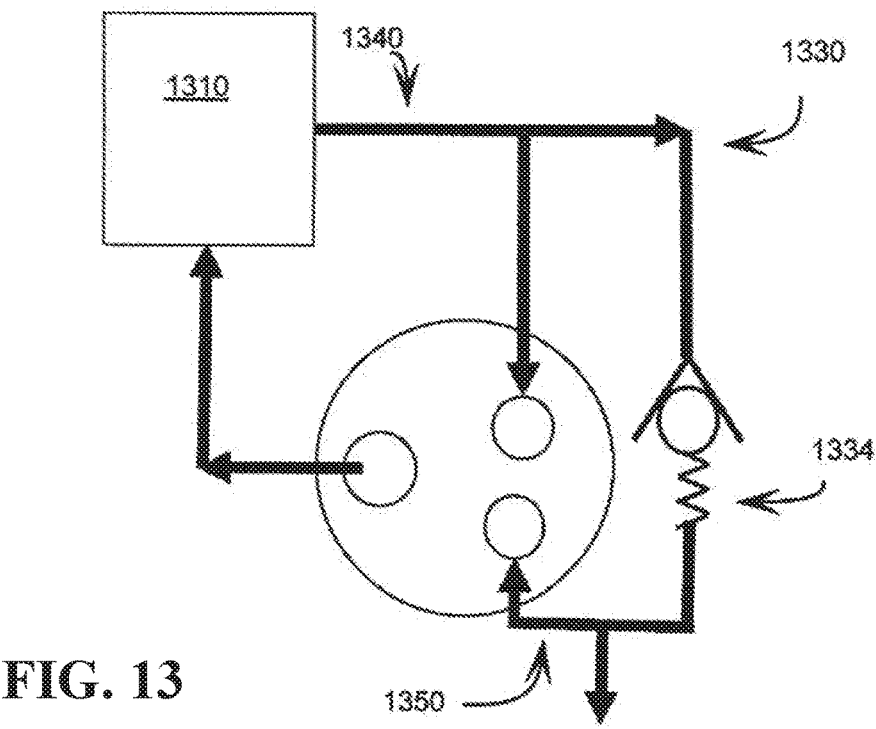
FIG. 13 is a schematic diagram of example hydraulic components for implementing a braking circuit and a main event collapsing circuit controlled by a proportional valve in an apparatus and system for sequencing valve events according to aspects of the disclosure.
Figure 14:
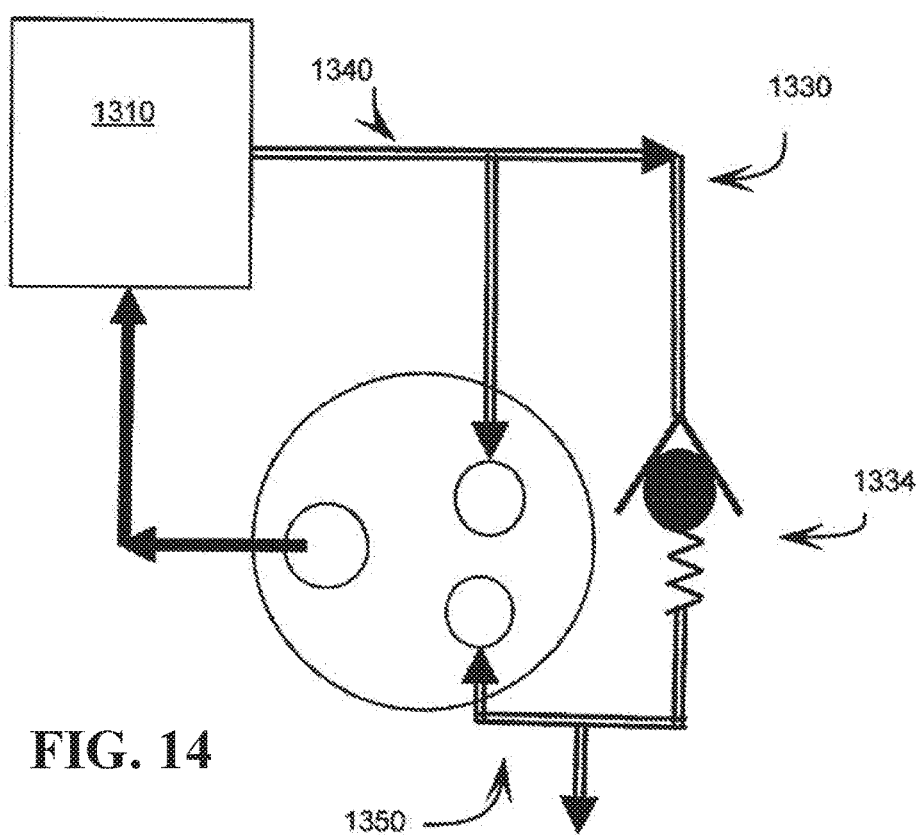
FIG. 14 is a schematic diagram illustrating active and non-active flows in the example apparatus and system of FIG. 13 in a "brake off" status.
Figure 15A:
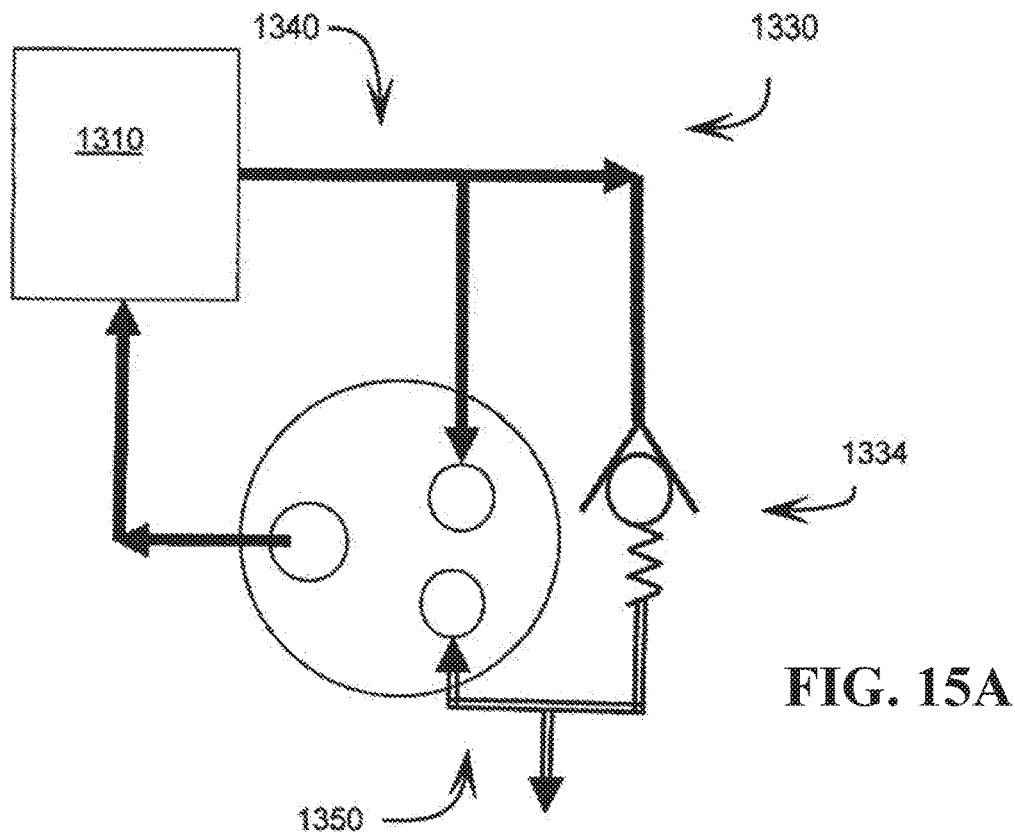
FIGS. 15A and 15B are schematic diagrams illustrating active and non-active flows in the example apparatus of FIG. 13 in a "brake on" status with a single-outlet proportional valve providing fluid under a first pressure and providing fluid in a "brake on" status under a second pressure, sufficient to activate a main event collapsing device, respectively, according to an aspect of the disclosure.
Figure 15B:
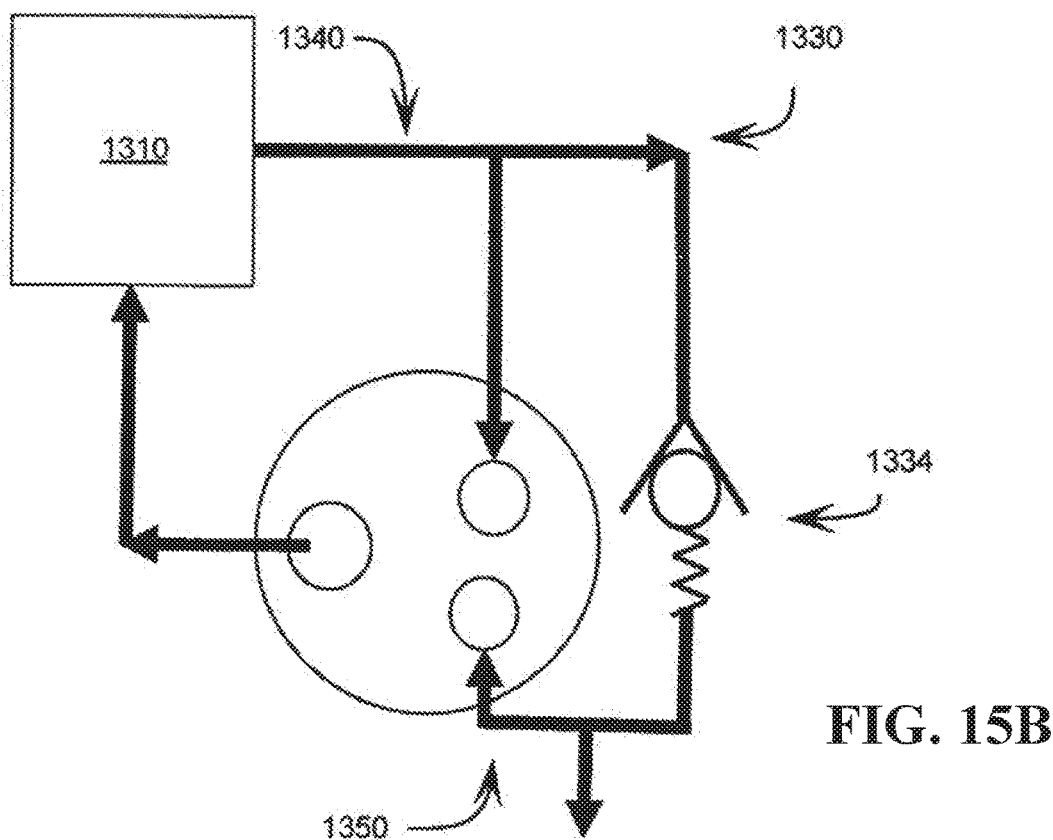

FIGS. 13, 14 15A and 15B illustrate an example system and apparatus for valve event sequencing using a single-outlet proportional valve which permits a variable pressure supply to the braking and collapsing circuits. As known in the art, a proportion valve provides varying level of fluid output in proportion to the electrical current used to control the proportional valve. FIG. 13 is a schematic diagram of example hydraulic components for implementing a braking circuit a main event collapsing circuit controlled by a proportional valve in an apparatus and system for sequencing valve events according to aspects of the disclosure. Proportional valve 1310 feeds a collapsing circuit 1330 and a braking circuit 1340 via a single outlet. A check valve 1334 implements a threshold minimum pressure required for activation of the collapsing circuit 1330. When the proportional valve outlet pressure is increased beyond this threshold, activation of the collapsing circuit occurs, i.e., the check valve opens and permits fluid flow to the collapsing circuit. FIG. 14 shows the system in a "brake off" mode in which the supply flow paths to the braking circuit 1340 and collapsing circuit 1330 receive no flow, i.e., the proportional valve 1310 is controlled to provide no fluid output. In this and subsequent figures, the solid arrows represent active flow whereas the outlined arrows represent non-active or no flow. FIG. 15A shows the system in a "brake on" mode in which the proportional valve 1310 initially provides fluid to the circuits at a first pressure, lower than that needed to open check valve 1334. In this mode, the brake mechanism is activated under pressure in the braking circuit 1340. As pressure from the proportional valve increases (in proportion to increasing control current applied to the proportional valve 1310) to a second pressure beyond the threshold pressure set by check valve 1334, flow occurs in the collapsing circuit 1330. In this manner, the sequential operation of the brake mechanism and the collapsing element can be controlled with appropriate control of the time rate of increase of pressure output by proportional valve 1310. A bleed path 1350 may permit flow of fluid from the collapsing circuit to ambient to enable quick response of the system to a "turn off" command (in which fluid output from the valve 1310 is discontinued) for the braking mechanism. Bleed path 1350 provides for a rapid decrease in pressure in the collapsing circuit compared to the pressure decrease from a gradual backflow to the proportional valve. This provides for a quick deactivation of the collapsing circuit and ensures that the main event motion of exhaust valves will reactivate before the braking circuit "turns off."

Figure 16A:
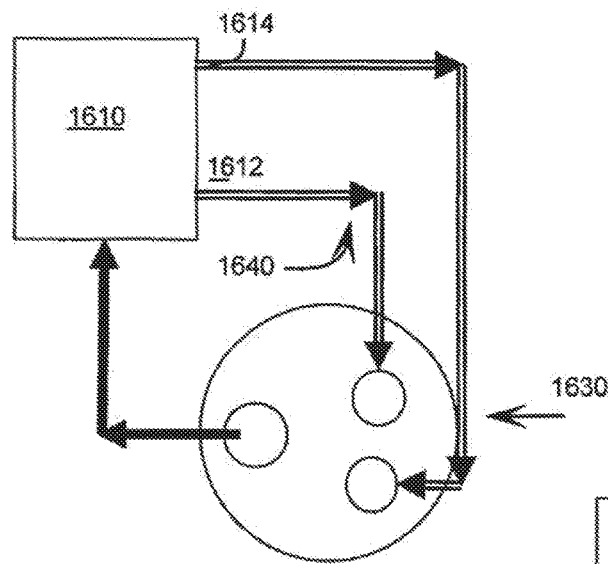
FIGS. 16A, 16B and 16C are schematic diagrams illustrating active and non-active flows in an example apparatus and system which utilize a multiple-outlet proportional valve.
Figure 16B:
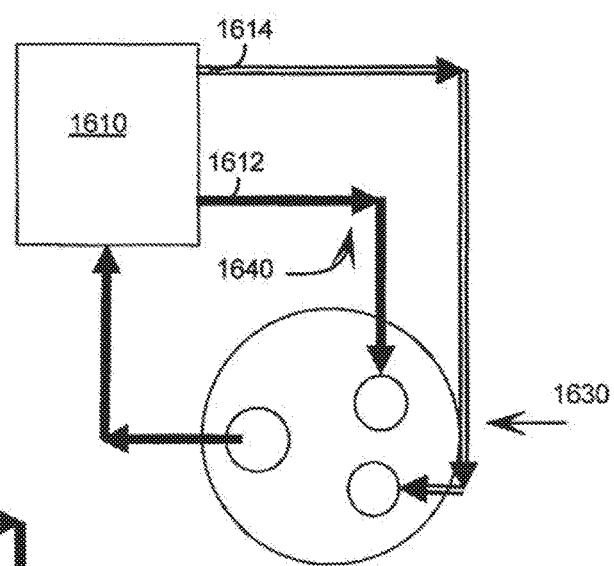
Figure 16C:
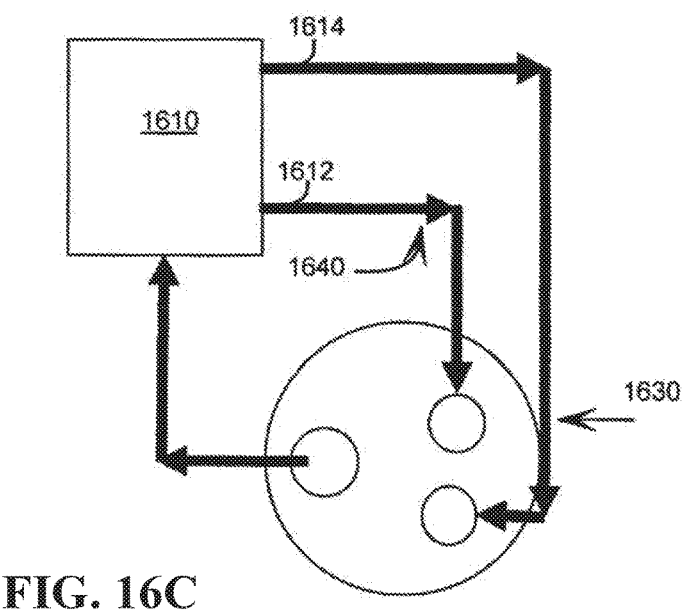

FIGS. 16A, 16B and 16C are schematic diagrams illustrating active and non-active flows in an example apparatus and system which utilizes a multiple-outlet proportional valve. FIG. 16A illustrates the system in a "brake off" status, with non-active flows in both the braking circuit 1640 and the collapsing circuit 1630, which may be supplied, respectively, by a first proportional valve outlet 1612 and a second proportional valve outlet 1614. FIG. 16B illustrates the system in a "brake on" status with the first outlet 1612 providing flow to activate a braking circuit 1640. FIG. 16C illustrates a "brake on" status with the second outlet 1614 providing flow to activate the collapsing circuit 1630. Proportional valve 1610 may be configured such that it will only supply fluid to outlet one initially, and then, after a desired delay period has passed, will supply fluid to the second outlet. This may be facilitated by appropriate control signals to the proportional valve 1610.

Figure 17A:
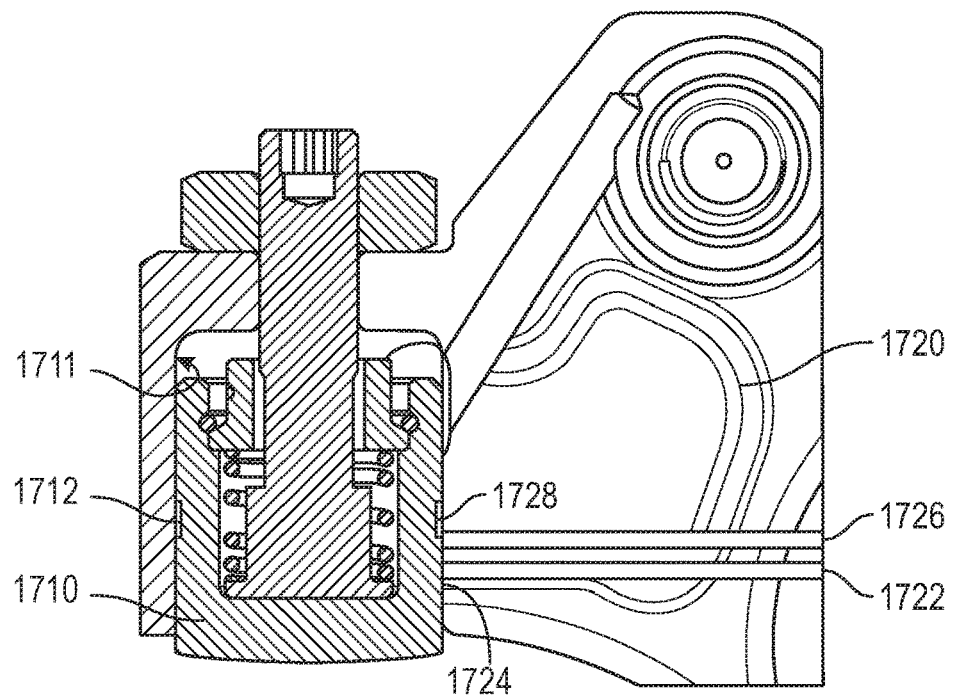
FIGS. 17A and 17B are cross-sections of an example engine braking mechanism comprising a brake piston and hydraulic passages configured to indicate when the brake piston has fully indexed according to aspects of the disclosure.
Figure 17B:
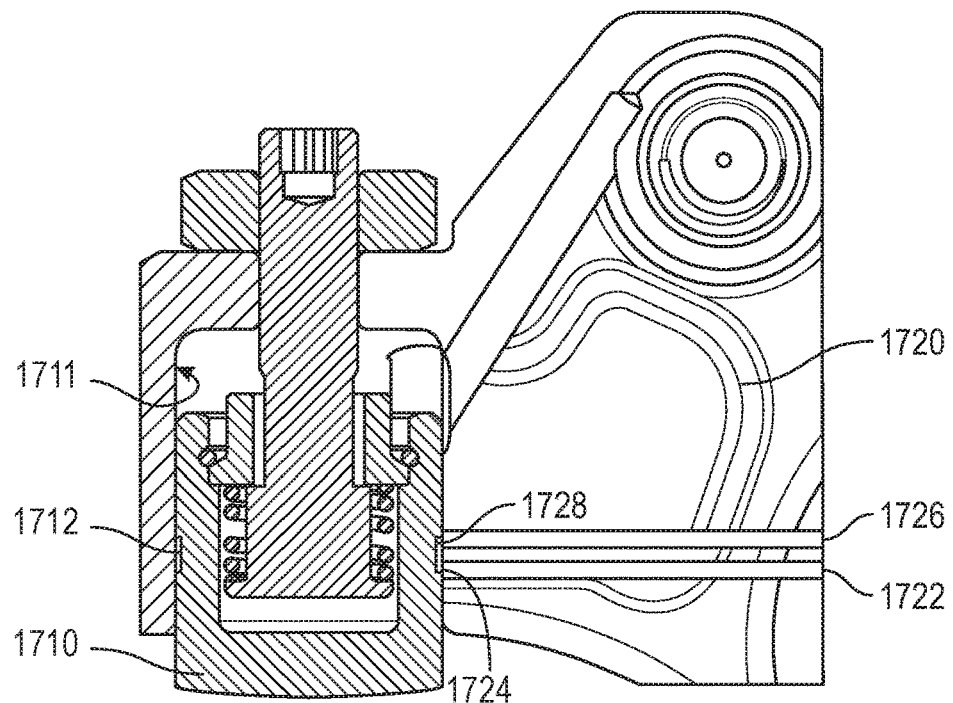

FIGS. 17A and 17B are cross-sections of an example engine braking mechanism comprising a brake piston and hydraulic passages configured to indicate when the brake piston has fully indexed according to aspects of the disclosure. A braking mechanism piston 1710 may be mounted for sliding movement within a bore 1711 in a brake piston housing 1720, as described above with reference to FIG. 3. A fluid supply passage 1722 formed in housing 1720 may be constantly pressurized and may terminate at a port 1724 communicating with the housing bore 1711. A main event collapsing or deactivation passage 1726 may also be formed in the housing 1720 and may terminate at a port 1728 communicating with the housing bore 1711. To facilitate selective communication of the supply passage 1722 and the main event collapsing passage 1726, piston 1710 may be provided with an annular channel or recess 1712. When piston is in a deactivated or non-steady state (i.e., transient) position, such as that shown in FIG. 17A, channel or recess 1712 is disposed above (i.e., not aligned with) the deactivation passage port 1728 or the supply passage port 1724 and thus a collapsing circuit, fed by the collapsing passage 1726 remains in a deactivated state (i.e., not collapsed). When piston 1710 is in a steady-state position, shown in FIG. 17B, the channel or recess 1712 is aligned with both ports 1724 and 1728 to provide for fluid communication between the supply passage 1722 and collapsing passage 1728, thereby causing activation of the collapsing circuit. Thus, activation of the collapsing circuit occurs only after the brake piston 1712 reaches a steady state position.

Figure 18:
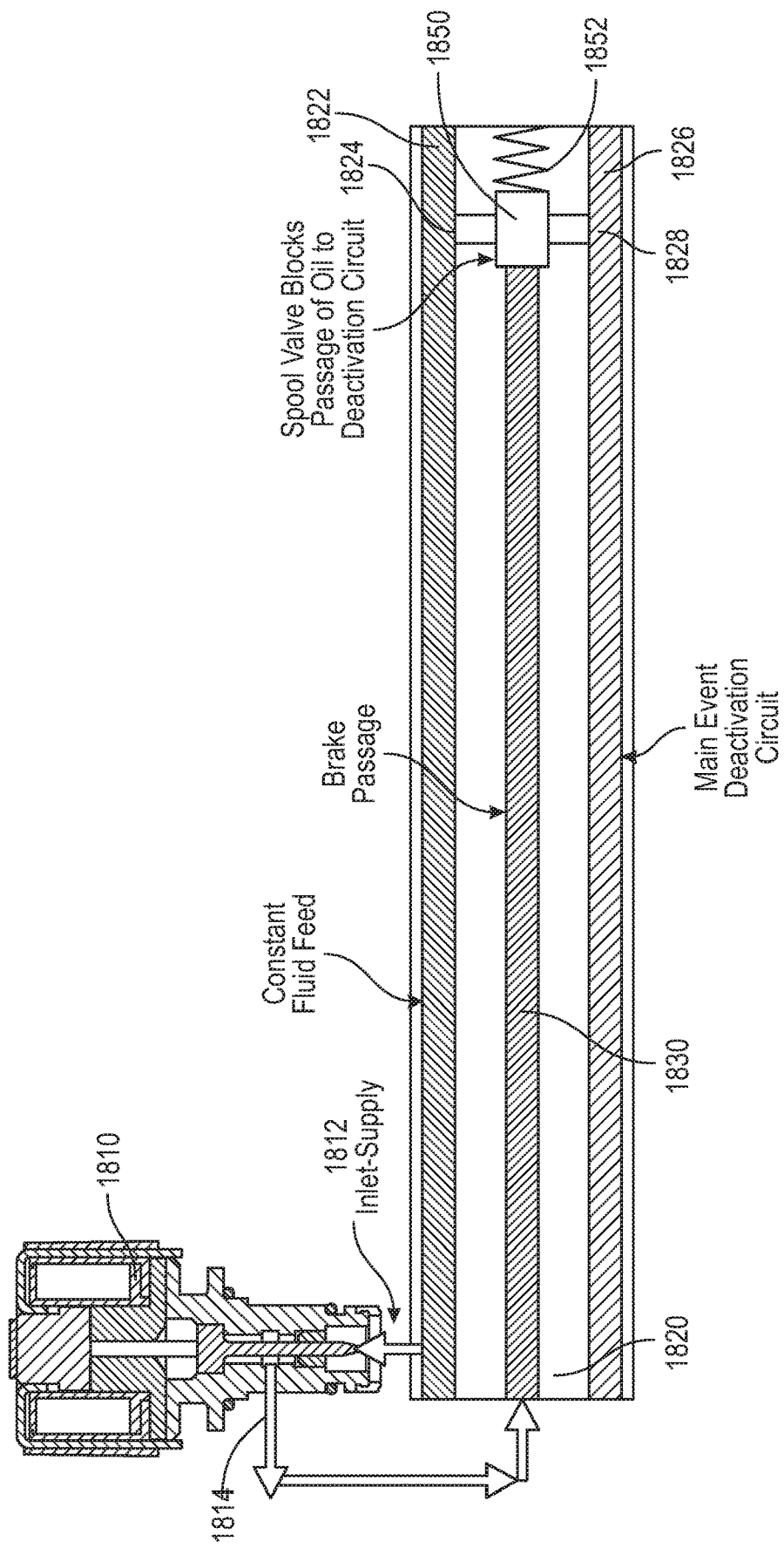
FIG. 18 illustrates a spool valve operated under control of a solenoid valve to sequence activation of a braking circuit and a main event collapsing/deactivation circuit.

FIG. 18 illustrates a schematic representation of a system which utilizes a spool valve operated under control of a solenoid valve to sequence activation of a braking circuit and a main event collapsing/deactivation circuit. A supply passage 1822 may be formed in a housing (rocker shaft) 1820 and may contain a supply of constantly pressurized fluid. An inlet 1812 of a solenoid valve 1810 may also be fed from and communicate with supply passage 1822. A collapsing/deactivation passage 1826 is also formed in the housing 1820. Solenoid valve outlet 1814 feeds a braking fluid passage 1830 also formed in the housing. Spool valve 1850, which is biased against the pressure in braking fluid passage 1830 by a spring 1852, may move within the housing 1820 under pressure in braking fluid passage 1830. When the braking fluid passage 1830 is fully filled, spool valve 1850 moves to an indexed position where it provides for fluid communication between the supply passage 1822 and collapsing passage 1826. Ports 1824 and 1828 facilitate this fluid communication. Thus, the indexing of the spool valve 1850 provides sufficient delay to the activation of the collapsing circuit.

As will be recognized, other implementations for creating delay between the braking mechanism activation and lost motion device activation may be utilized. For example, solenoids with different response times may be employed for respective braking mechanism hydraulic circuit and the lost motion hydraulic circuit. As a further example, mechanical components in valve trains may facilitate delay. Where the lost motion device and braking mechanism include spring elements, for example, the spring force constants of the respective springs may be selected to facilitate a delay in the lost motion device activation and also facilitate more rapid response of the braking mechanism.

Figure 19:
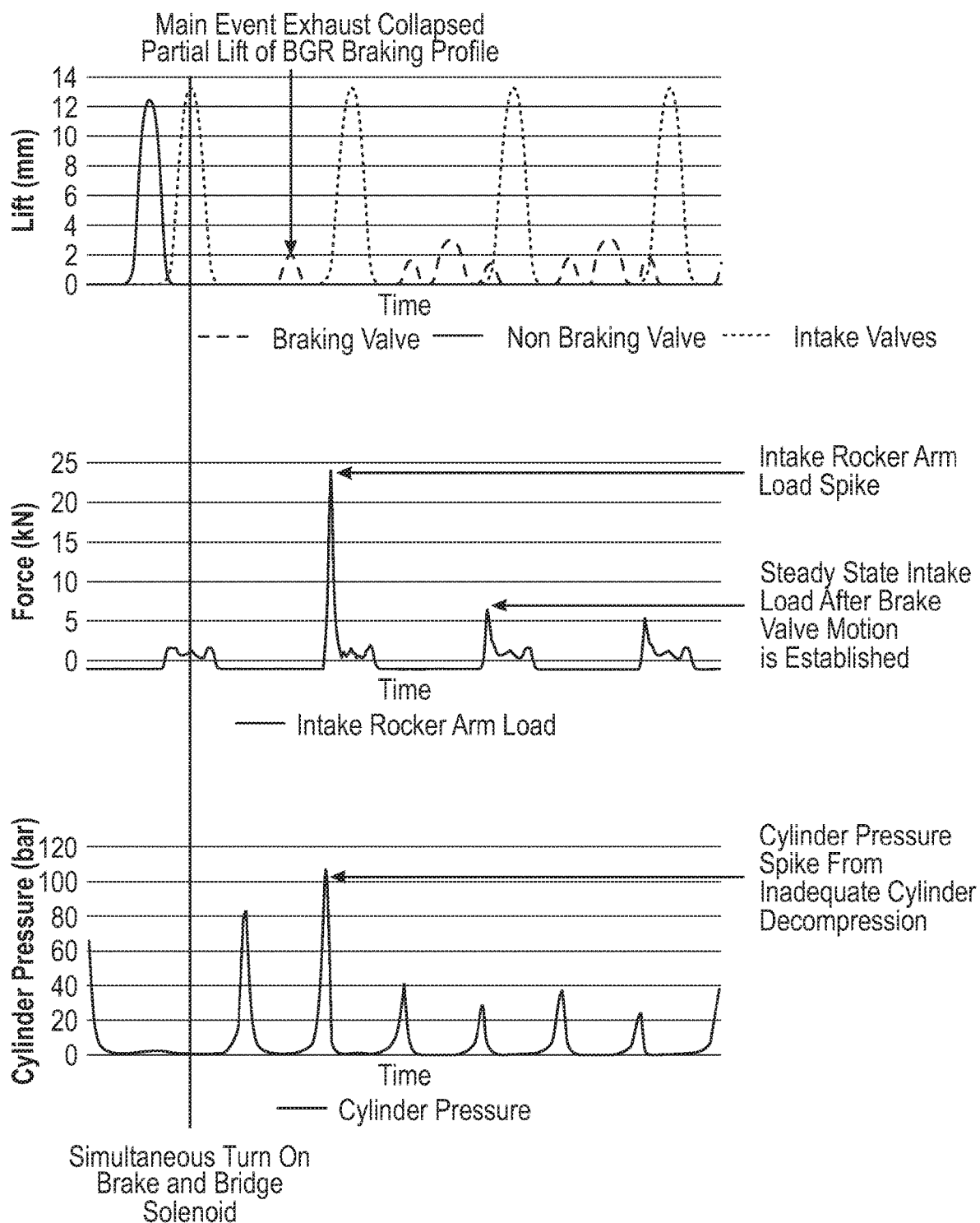
FIG. 19 illustrates example curves representing valve lift, valve train force and cylinder pressure as a function of time for prior art systems.

FIG. 19 illustrates example curves representing valve lift, valve train force and cylinder pressure as a function of time for prior art systems. As can be seen, prior art systems are characterized by load and cylinder pressure spikes that occur as a result of transient delays in brake valve motion. These spikes typically subside after the system reaches steady state. However, the initial spike may result in excessive loading on valve train elements as well as counter flow in intake flow paths.

Figure 20:
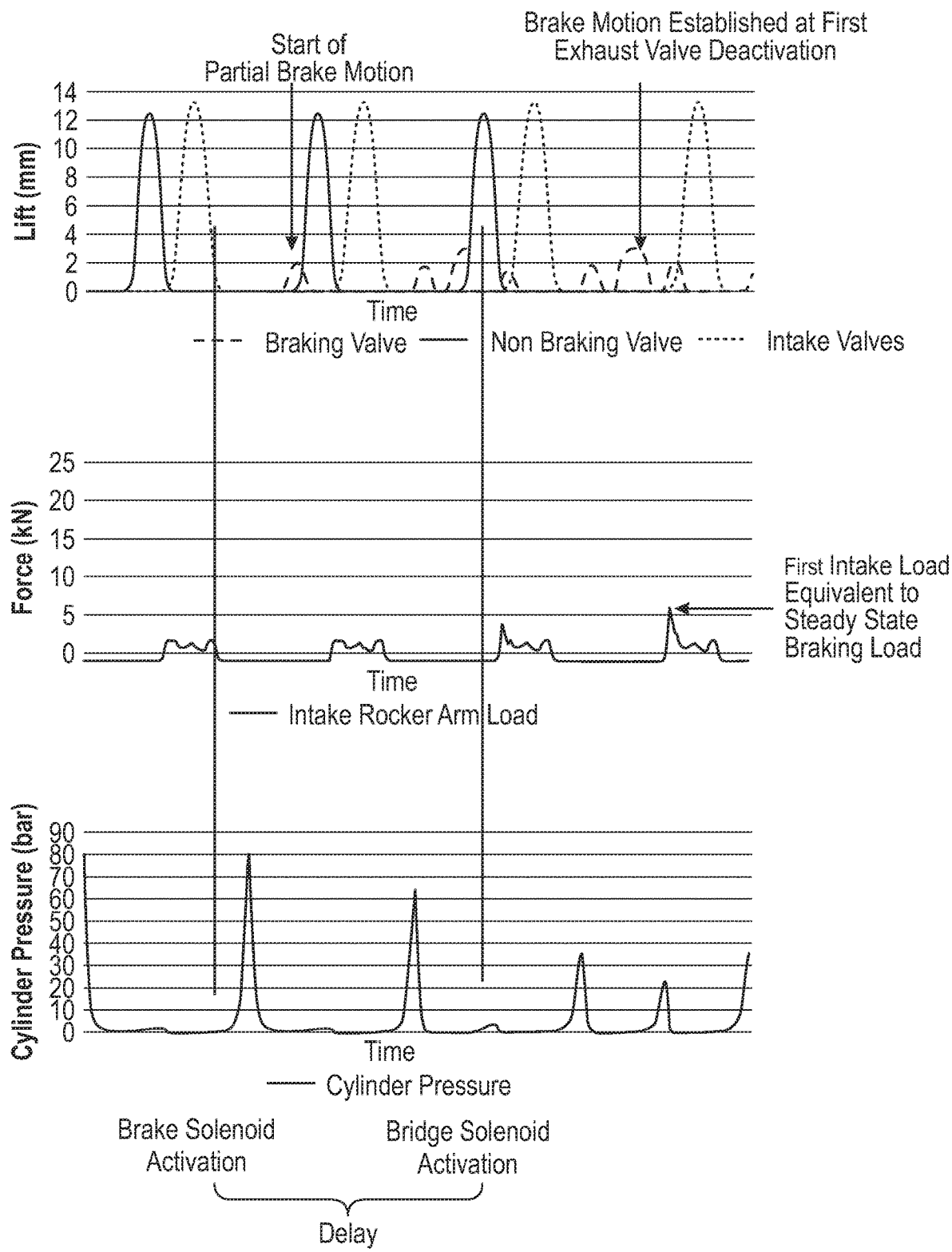
FIG. 20 illustrates example curves representing valve lift, valve train force and cylinder pressure as a function of tie for an enhanced braking system having one or more of the valve motion sequencing aspects described herein.

FIG. 20 illustrates example curves representing valve lift, valve train force and cylinder pressure as a function of tie for an enhanced braking system having one or more of the valve motion sequencing aspects described above. As can be seen, in the case where a delay is implemented between activation of the braking mechanism and activation of the collapsing device (bridge solenoid activation), any transient intake loading is substantially equivalent to steady state loading of the system.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for controlling counter flow and pressure in an intake flow path of an internal combustion engine during an engine braking operation, the internal combustion engine comprising at least one cylinder, an intake flow path communicating with the at least one cylinder, at least one intake valve disposed in the intake flow path, an exhaust flow path communicating with the at least one cylinder and at least one exhaust valve disposed in the exhaust flow path, the method comprising:

deactivating main event motion of the at least one exhaust valve;

initiating activation of an engine braking mechanism associated with the at least one exhaust valve to perform a 1.5 stroke or 2.0 stroke high power density braking operation, the initiating step causing an initial transient state of the engine braking mechanism, during which the engine braking mechanism is not yet capable of causing braking motion of the least one exhaust valve and during which motion of the at least one intake valve tends to permit counterflow from the at least one cylinder into the intake flow path, and thereafter a steady state of the engine braking mechanism, during which the engine brake mechanism is ready to perform engine braking; and in response to the step of initiating activation of the engine braking mechanism, and during the transient state of the engine braking mechanism, initiating a step of counterflow management and thereby managing counterflow in the intake flow path with at least one airflow management device disposed in at least one of the intake flow path or the exhaust flow path to thereby reduce counterflow that would otherwise be permitted in the intake flow path during the transient state of the engine brake mechanism.

2. The method of claim 1, wherein the airflow management device includes an exhaust gas recirculation valve in communication with the intake flow path and the exhaust flow path, the exhaust gas recirculation valve providing a first level of communication between the intake flow path and the exhaust flow path during steady-state engine braking operation, and wherein managing counterflow in the intake flow path further comprises:

no later than deactivation of the main event motion of the at least one exhaust valve, controlling the exhaust gas recirculation valve to increase communication between the intake flow path and the exhaust flow path above the first level of communication.

3. The method of claim 1, wherein the airflow management device comprises an intake throttle valve disposed in the intake flow path, the intake throttle providing a first level of flow in the intake flow path during steady state engine braking operation, and wherein managing counterflow in the intake flow path further comprises:

no later than deactivation of the main event motion of the at least one exhaust valve, controlling the intake throttle valve to restrict flow in the intake flow path below the first level of flow.

4. The method of claim 1, wherein the airflow management device comprises a turbocharger in communication with the intake flow path and the exhaust flow path, a turbine of the turbocharger configured to provide a first level of boost pressure in the intake flow path during steady state engine braking operation, and wherein managing counterflow in the intake flow path further comprises:

no later than deactivation of the main event motion of the at least one exhaust valve, controlling the turbine to decrease boost pressure in the intake flow path below the first level of boost pressure.

5. The method of claim 1, wherein the airflow management device comprises a turbocharger in communication with the intake flow path and the exhaust flow path and a wastegate in communication with the exhaust flow path, the wastegate and the turbocharger configured to provide a first level of boost pressure in the intake flow path during steady state engine braking operation, and wherein managing counterflow in the intake flow path further comprises:

no later than deactivation of the main event motion of the at least one exhaust valve, controlling the wastegate to decrease boost pressure provided by the turbocharger in the intake flow path below the first level of boost pressure.

6. The method of claim 1, wherein the airflow management device comprises a turbocharger in communication with the intake flow path and the exhaust flow path and an exhaust throttle valve in the exhaust flow path, the exhaust throttle valve and the turbocharger configured to provide a first level of boost pressure in the intake flow path during steady state engine braking operation, and wherein managing counterflow in the intake flow path further comprises:

no later than deactivation of the main event motion of the at least one exhaust valve, controlling the exhaust throttle valve to decrease boost pressure provided by the turbocharger in the intake flow path below the first level of boost pressure.

7. The method of claim 1, wherein the airflow management device comprises a turbocharger in communication with the intake flow path and the exhaust flow path and a compressor bypass valve in communication with the intake flow path, the compressor bypass valve and the turbocharger configured to provide a first level of boost pressure in the intake flow path during steady state engine braking operation, and wherein managing counterflow in the intake flow path further comprises:

no later than deactivation of the main event motion of the at least one exhaust valve, controlling the compressor bypass valve to decrease boost pressure provided by the turbocharger in the intake flow path below the first level of boost pressure.

8. The method of claim 1, wherein the airflow management device comprises a passive blow-off valve in communication with the intake flow path, and wherein managing counterflow in the intake flow path further comprises:

configuring the passive blow-off valve to open when pressure within in the intake flow path exceeds a predetermined threshold.

9. The method of claim 1, wherein the airflow management device comprises an active blow-off valve in communication with the intake flow path, and wherein managing counterflow in the intake flow path further comprises:

no later than deactivation of the main event motion of the at least one exhaust valve, controlling the active blow-off valve to open.

10. The method of claim 1, wherein the step of deactivating the main event motion of the at least one exhaust valve further comprises collapsing an exhaust valvetrain lost-motion device to absorb main event motion of the at least one exhaust valve.

11. The method of claim 10, further comprising the step of deactivating main event motion of the at least one intake valve and adding a secondary motion to at least one of the at least one exhaust valve and the at least one intake valve.

12. The method of claim 1, further comprising the step of deactivating main event motion of the at least one intake valve and adding a secondary motion to at least one of the at least one exhaust valve and the at least one intake valve.

13. The method of claim 1, further comprising the step of adding a secondary motion to the at least one exhaust valve when the main event motion of the at least one exhaust valve is deactivated.

14. The method of claim 1, further comprising the step of maintaining main event motion of the at least one intake valve while the main event motion of the at least one exhaust valve is deactivated.

15. The method of claim 1, wherein the braking motion of the at least one exhaust valve includes two respective secondary lift events of the at least one exhaust valve, the two secondary lift events corresponding to immediately successive strokes of a piston in a four-stroke engine cycle.

16. The method of claim 1, wherein deactivating main event motion of the at least one exhaust valve comprises activating a lost motion device.

17. The method of claim 16, further comprising delaying activation of the lost motion device until the engine brake mechanism is in the steady state.

* * * * *